(12) United States Patent
Tower

(10) Patent No.: US 8,876,081 B2
(45) Date of Patent: Nov. 4, 2014

(54) ROTARY SHEAR VALVE ASSEMBLY WITH A POLYMER INSERT DEVICE

(75) Inventor: Christopher R. Tower, Rohnert Park, CA (US)

(73) Assignee: IDEX Health & Science LLC, Northbrook, IL (US)

( * ) Notice: Subject to any disclaimer, the term of this patent is extended or adjusted under 35 U.S.C. 154(b) by 270 days.

(21) Appl. No.: 13/296,011

(22) Filed: Nov. 14, 2011

(65) Prior Publication Data

US 2012/0119127 A1 May 17, 2012

Related U.S. Application Data

(63) Continuation-in-part of application No. 12/833,834, filed on Jul. 9, 2010.

(60) Provisional application No. 61/225,143, filed on Jul. 13, 2009, provisional application No. 61/301,516, filed on Feb. 4, 2010, provisional application No. 61/328,594, filed on Apr. 27, 2010.

(51) Int. Cl.
*F16K 5/10* (2006.01)
*F16K 3/08* (2006.01)
*F16K 27/04* (2006.01)
*F16K 25/00* (2006.01)

(52) U.S. Cl.
CPC .............. *F16K 3/08* (2013.01); *F16K 27/045* (2013.01); *F16K 25/005* (2013.01)
USPC ........... 251/208; 251/180; 251/192; 251/304; 137/625.15

(58) Field of Classification Search
USPC ......... 251/157, 176, 180, 192, 208, 304, 314; 137/625.15, 625.46, 876
See application file for complete search history.

(56) References Cited

U.S. PATENT DOCUMENTS 1,207,428 A 12/1916 Bloom
2,911,008 A * 11/1959 Du Bois .................. 137/625.31

(Continued)

FOREIGN PATENT DOCUMENTS

EP 0 416 294 A1 8/1990
EP 0 508 749 A2 10/1992

(Continued)

OTHER PUBLICATIONS

Extended Search Report dated Feb. 25, 2013 from European Application No. 12192555.6-1754.

(Continued)

*Primary Examiner* — John K Fristoe, Jr.
*Assistant Examiner* — Ian Paquette
(74) *Attorney, Agent, or Firm* — Beyer Law Group LLP

(57) ABSTRACT

A multi-position rotary shear valve assembly having a metallic or ceramic stator device and a metallic or ceramic rotor device. The stator device defines a planar stator face and two or more stator channels in fluid communication with the stator face at corresponding stator ports, while the rotor device includes a substantially planar rotor face defining one or more rotor channels. A tribological coating is disposed atop at least one of the rotor and stator face. The valve assembly includes a polymer insert device defining an exposed contact face having an inner diameter less than that of the outer circumferential edge and an outer diameter more than the outer circumferential edge. The insert device is formed for press-fit insertion in a groove defined in the rotor face. The outer circumferential edge of the stator face contacts the insert exposed face during rotation between the two or more rotor positions.

22 Claims, 27 Drawing Sheets

(56) References Cited

U.S. PATENT DOCUMENTS

| | | | |
|---|---|---|---|
| 3,203,249 A | 8/1965 | Etal | |
| 3,230,048 A | 1/1966 | Skeggs | |
| 3,297,053 A | 1/1967 | McKinney | |
| 3,329,167 A * | 7/1967 | Boettcher et al. | 137/625.46 |
| 3,747,630 A * | 7/1973 | Hurrell | 137/312 |
| 3,929,112 A | 12/1975 | Pagdin | |
| 4,431,161 A * | 2/1984 | Miller et al. | 251/129.11 |
| 4,444,066 A | 4/1984 | Ogle et al. | |
| 4,501,297 A * | 2/1985 | Baker | 137/625.46 |
| 4,550,742 A | 11/1985 | Stearns | |
| 4,846,098 A | 7/1989 | Kobayashi et al. | |
| 4,865,071 A | 9/1989 | Lambert et al. | |
| 4,966,789 A | 10/1990 | Knapp et al. | |
| 5,194,226 A | 3/1993 | Tomoff et al. | |
| 5,620,025 A | 4/1997 | Lewin | |
| 5,901,387 A | 5/1999 | Fan | |
| 5,934,320 A | 8/1999 | O'Reilly et al. | |
| 6,193,213 B1 * | 2/2001 | Stearns et al. | 251/175 |
| 6,267,143 B1 | 7/2001 | Schick | |
| 6,748,975 B2 | 6/2004 | Hartshorne et al. | |
| 6,942,265 B1 * | 9/2005 | Boyd et al. | 294/189 |
| 7,308,908 B2 | 12/2007 | Keene et al. | |
| 2002/0195150 A1 | 12/2002 | Schick | |
| 2003/0196700 A1 | 10/2003 | Gilbert | |
| 2008/0258094 A1 * | 10/2008 | Usowicz et al. | 251/304 |
| 2010/0102264 A1 | 4/2010 | Bickoff et al. | |
| 2011/0006237 A1 | 1/2011 | Tower | |

FOREIGN PATENT DOCUMENTS

| | | |
|---|---|---|
| GB | 2 213 912 A | 8/1989 |
| JP | 5-79069 | 3/1993 |
| JP | 5-501903 | 4/1993 |
| JP | 2000-283302 | 10/2000 |
| WO | WO 91/14134 | 9/1991 |

OTHER PUBLICATIONS

International Search Report dated Feb. 8, 2011 from International Application No. PCT/US2010/041612.

Written Opinion dated Feb. 8, 2011 from International Application No. PCT/US2010/041612.

Japanese Office Action dated Apr. 30, 2014 from Japanese Application No. 2012-520688.

* cited by examiner

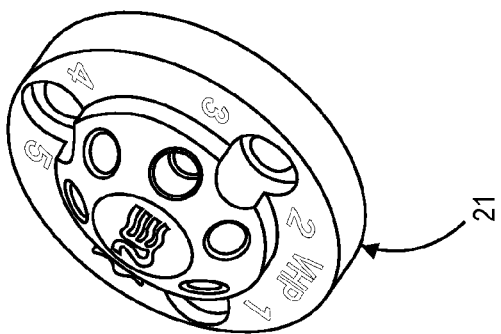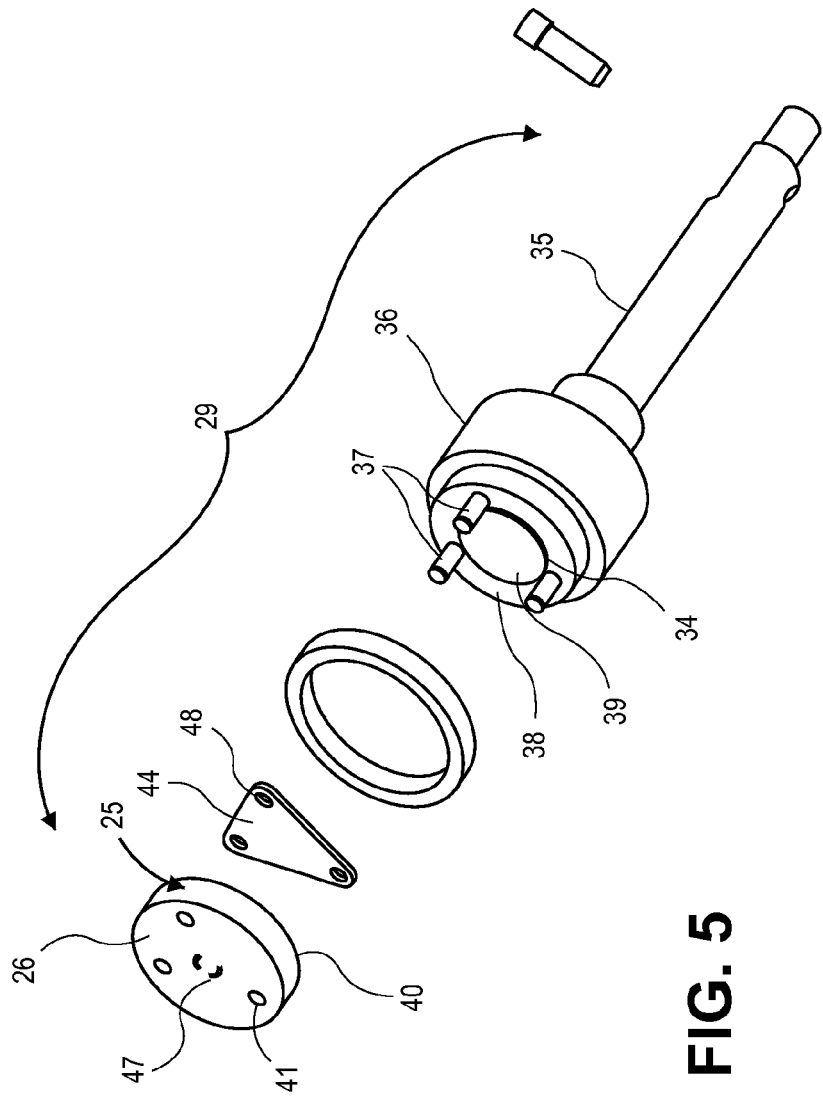
FIG. 5

ROTARY SHEAR VALVE ASSEMBLY WITH A POLYMER INSERT DEVICE

CROSS REFERENCE TO RELATED APPLICATIONS

This application is a continuation-in-part application based upon patent application Ser. No. 12/833,834, filed Jul. 9, 2010, which in turn claims priority under 35 U.S.C. §119(e) from U.S. Provisional Patent Application No. 61/225,143, filed Jul. 13, 2009; 61/301,516, filed Feb. 4, 2010; and 61/328,594, filed Apr. 27, 2010, all of which are entitled "ROTARY SHEAR VALVE ASSEMBLY WITH HARD-ON-HARD SEAL SURFACES", all naming Tower as the inventor, and all of which are incorporated by reference in their entirety.

FIELD OF THE INVENTION

The present invention relates to rotary shear valves, and more particularly, relates to shear valves that incorporate hard-on-hard sealing surfaces.

BACKGROUND OF THE INVENTION

Current high pressure liquid chromatography shear valves typically employ a metallic element and a rotor device composed of a polymer material that forms fluid-tight seal at a rotor/stator interface. While this combination has been found to be successful, it is limited in pressure rating and valve lifetime. For example, applications requiring high pressures above 15 Kpsi and a lifetime greater than about 10K cycles are not consistently attainable and sustainable using this combination.

Accordingly, it is desirable to provide a shear face valve capable of holding pressures greater than about 15 Kpsi that have expected valve lifetimes greater than 50K cycles.

SUMMARY OF THE INVENTION

The present invention provides a rotary shear valve assembly including a stator device that defines a substantially planar stator face and at least two or more stator channels in fluid communication with stator face at corresponding stator ports. The valve assembly further includes a rotor device having a substantially hard, substantially planar rotor face defining one or more rotor channels. One of the stator face and the rotor face terminates at an outer circumferential edge, and the other of the rotor face and the stator face extends radially beyond the outer circumferential edge of the one stator face and the rotor face when the rotor device is rotatably mounted about a rotational axis to the stator device. Such rotational mounting is in a manner enabling fluid-tight, selective relative rotation between the rotor face and the stator face, at a rotor-stator interface, between two or more rotor positions. In accordance with the present invention, the valve assembly includes a polymer insert device that defines an exposed contact face having an insert inner diameter less than that of the outer circumferential edge and an insert outer diameter more than the outer circumferential edge. The insert device is formed and dimensioned for press-fit insertion in an insert receiving groove defined in the other of the rotor face and the stator face. The outer circumferential edge of the one of the stator face and the rotor face, thus, contacts the insert exposed face during the relative rotation between the two or more rotor positions.

In one specific embodiment, the insert exposed face is donut-shaped and substantially planar. Further, the receiving groove and the insert device cooperate to position the substantially planar insert exposed face substantially flush with the other of the substantially planar rotor face and the substantially planar stator face.

In another configuration, a groove inner diameter of the insert receiving groove is in the range of about 0.001 inch to about 0.002 inch greater than that of an insert inner diameter of the insert device.

In yet another specific embodiment, the polymer insert device is composed of a high compressive strength material, which includes a natural PAEK, a filled PAEK (or PEEK) or a polyimide material such as VESPEL®.

Still another configuration provides the stator face and the rotor face as being composed substantially of one a metallic material and a ceramic material.

The valve assembly further includes, in another embodiment, a tribological coating disposed atop at least one of the rotor face and the stator face. Such a coating, for instance, is a Diamond Like Carbon coating (DLC).

In yet another specific configuration, the valve assembly further includes a compliance assembly cooperating with the rotor device in a manner orienting the substantially planar rotor face substantially parallel to and substantially flush against the substantially planar stator face of the stator device.

In another aspect of the present invention, a rotary shear valve assembly is provided having a stator boss device defining a substantially hard, substantially planar stator face that terminates at an outer circumferential edge. A rotor device is further provided having a substantially hard, substantially planar rotor face that is configured to extend radially beyond the outer circumferential edge of the stator face when the rotor device is rotatably mounted about a rotational axis to the stator device. Such rotational mounting is in a manner enabling fluid-tight, selective relative rotation between the rotor face and the stator face, at a rotor-stator interface, between two or more rotor positions. A tribological coating is disposed atop at least one of the rotor face and the stator face. Further, the valve assembly includes a polymer insert device defining an exposed contact face having an insert inner diameter less than that of the outer circumferential edge and an insert outer diameter more than the outer circumferential edge. The insert device is formed and dimensioned for press-fit insertion in a receiving groove defined in the rotor face such that the outer circumferential edge of the stator face contacts the insert exposed face during the relative rotation between the two or more rotor positions.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

FIG. 5 is an exploded, top perspective view of a rotor assembly and the stator element of the micro-fluidic valve assembly of FIG. 1.

DETAILED DESCRIPTION OF THE INVENTION

Figure 2:
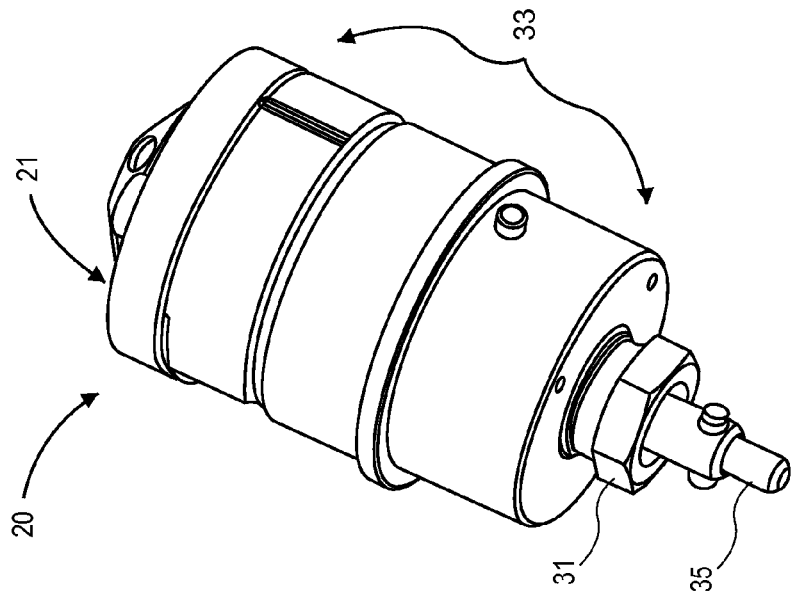
FIG. 2 is a bottom perspective view of the micro-fluidic valve assembly of FIG. 1.
Figure 1:
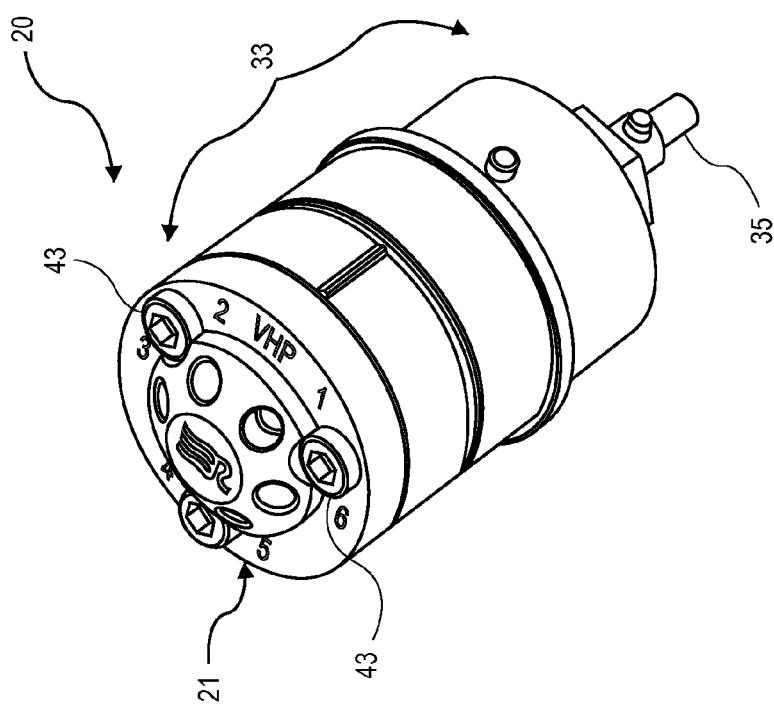
FIG. 1 is a top perspective view of a micro-fluidic valve assembly that incorporates both a metallic rotor element and a metallic stator element designed in accordance with the present invention.
Figure 4:
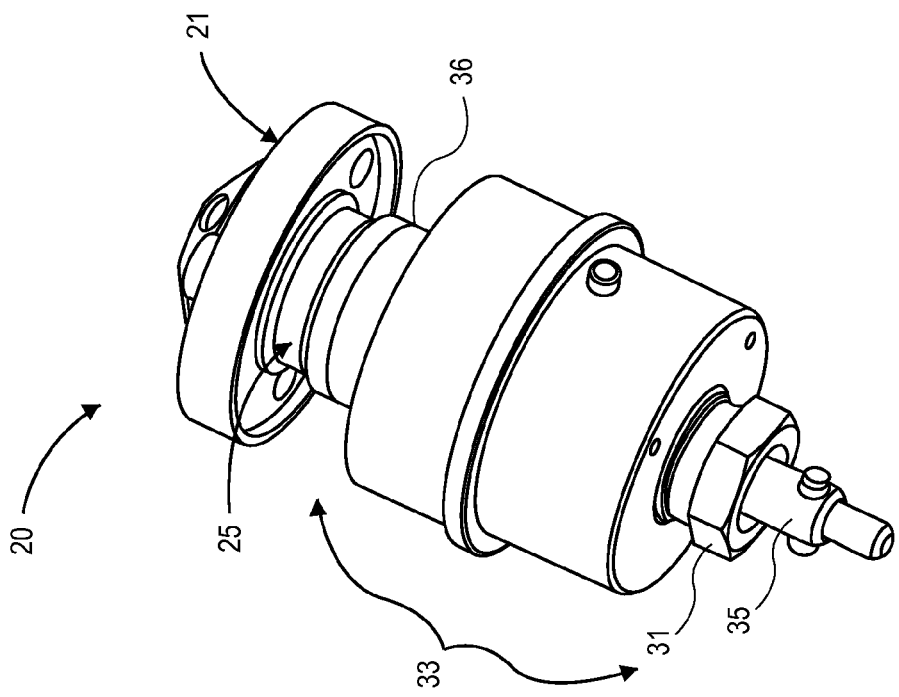
FIG. 4 is a side perspective view of the micro-fluidic valve assembly of FIG. 1, illustrated with the stator ring removed.
Figure 3:
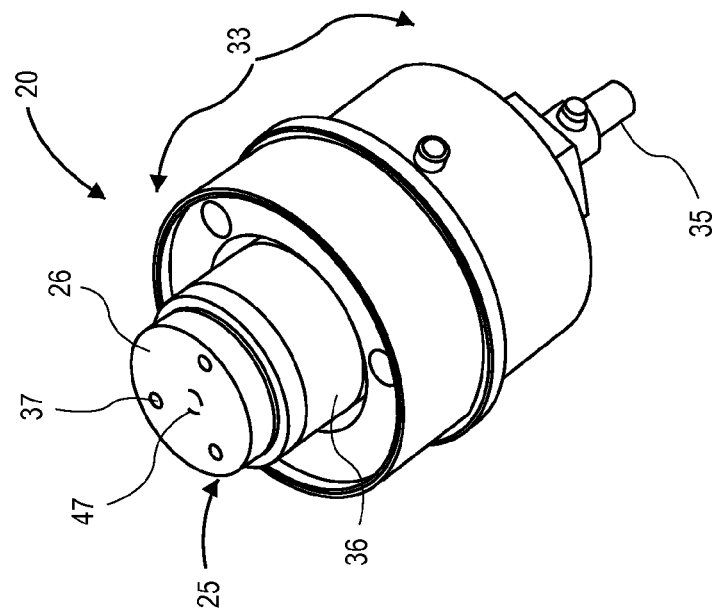
FIG. 3 is a top perspective view of the micro-fluidic valve assembly of FIG. 1, illustrating the rotor element with a stator ring and stator element removed.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now generally to FIGS. 1-8, a rotary shear valve assembly 20 is provided that includes a stator device 21 having a substantially metallic or ceramic, substantially planar stator face 22. The stator device defines at least two or more stator channels in fluid communication with stator face at corresponding stator ports 23. The valve assembly 20 further includes a rotor device 25 having a substantially metallic or ceramic, substantially planar rotor face 26. In accordance with the present invention, a tribological coating is disposed atop at least one of the rotor face and the stator face. Thus, when the rotor device 25 is rotatably mounted about a rotational axis for selective relative rotation between the rotor face and the stator face, at a rotor-stator interface, a fluid-tight seal is formed between the two metallic faces during relative rotation between two or more rotor positions.

Accordingly, due in part to the tribological coating, a metal-on-metal fluid-tight seal is formed at the rotor/stator interface for high pressure applications (i.e., 15 Kpsi to about 25 Kpsi) that is also capable of sustaining high lifecycle capacity (i.e., at least about 50K cycles). Such a tribological coating on at least one of the rotor face and/or stator face enables the formation of a durable fluid-tight and low friction seal under the necessary high pressure compressive pressures between the stator device and the rotor device.

As will be described, at least the rotor face 26 and the stator face 22 are both composed of a relatively rigid material for increased durability under high compression forces. In other configurations, the entire rotor device 25 and the stator device 21 is composed of a substantially rigid material.

Preferably, both the rotor device and the stator device are comprised of metallic compositions such as 316 Stainless Steel, Duplex Stainless Steel, titanium, Alloy Steels or Tool Steel compositions. Other suitable rigid materials, however, have been found that yield similar high pressure ability together with a high lifecycle capacity can be applied, as long as a suitable tribological coating is disposed atop at least one of the rotor face 26 and/or the stator face 22. One such suitable material family is ceramics, for instance, such as Alumina, SSIC, Zirconia. It will be appreciated, however, that whether the rotor and stator is composed of a metal or a ceramic material, that material must be capable of being coated with the tribological material.

Coating of at least one of the stator face and/or the rotor face has been found necessary in these high pressure applications in order to form a fluid-tight, low friction seal at the rotor/stator interface. Due to the substantially rigid material composition of the rotor face and the stator face, for the aforementioned desired reasons, these rigid materials are of course relatively non-compliable.

Such a coating, however, must also exhibit sufficient structural integrity for a high lifecycle under these high fluid pressure, high compressive force conditions. One such suitable and effective coating for pressurized fluid-tight seal formation between opposed rigid surface interfaces, under these conditions, is the tribological coatings. These coatings have been found to exhibit high strength (toughness) and low friction, as well as being resistant to most chemicals used in Liquid Chromatography.

One specific tribological coating that is particularly suitable for this application is the Diamond Like Carbon coatings (DLC), such as the BALINIT® DLC STAR and BALINIT® DLC provided by Balzers Oerlikon or the a DLC provided by Ionbond. Other tribological coatings that exhibit these characteristics, however, can be applied.

Figure 8:
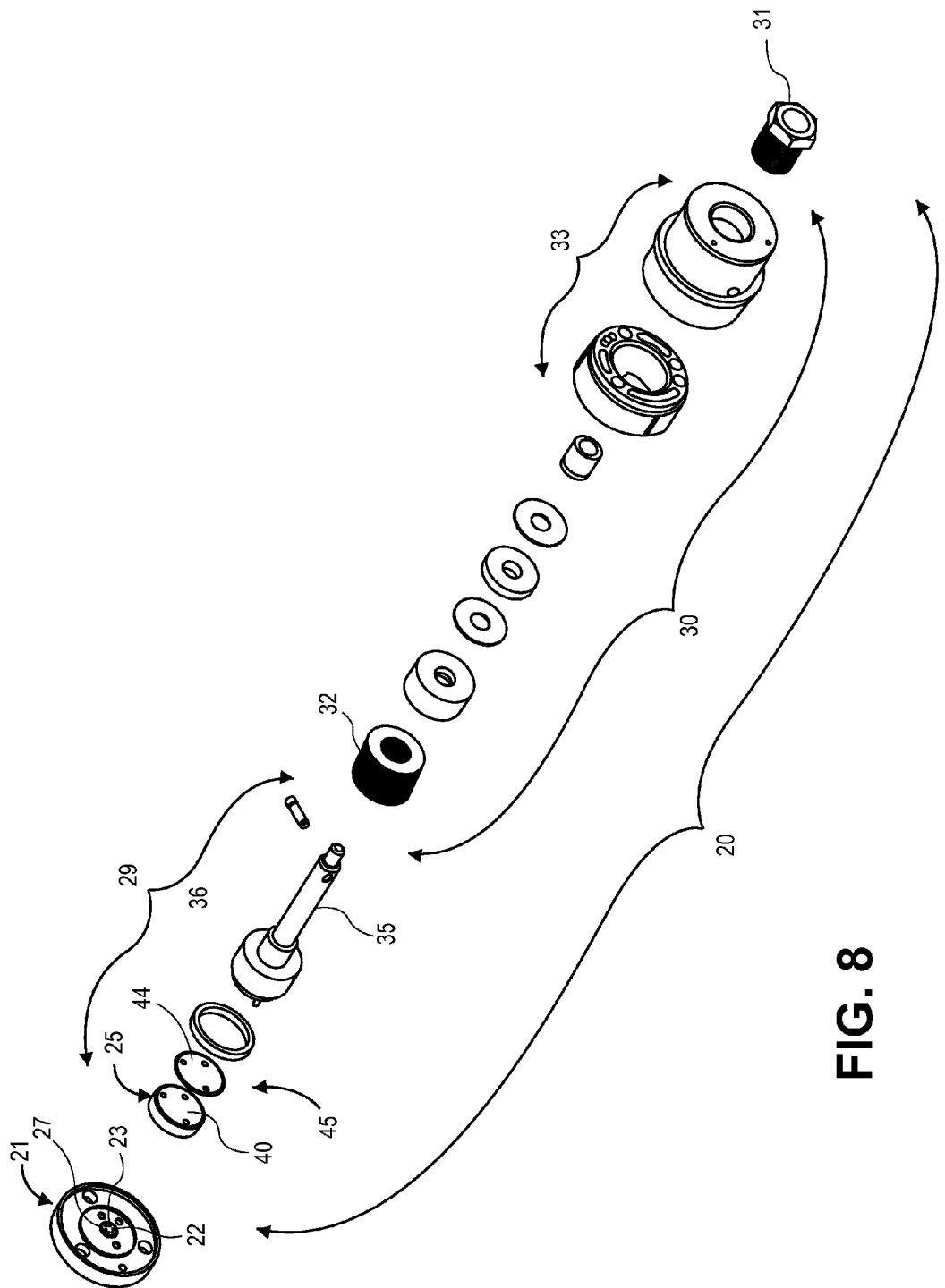
FIG. 8 is a reduced, exploded, bottom perspective view of the micro-fluidic valve assembly of FIG. 1.
Figure 9:
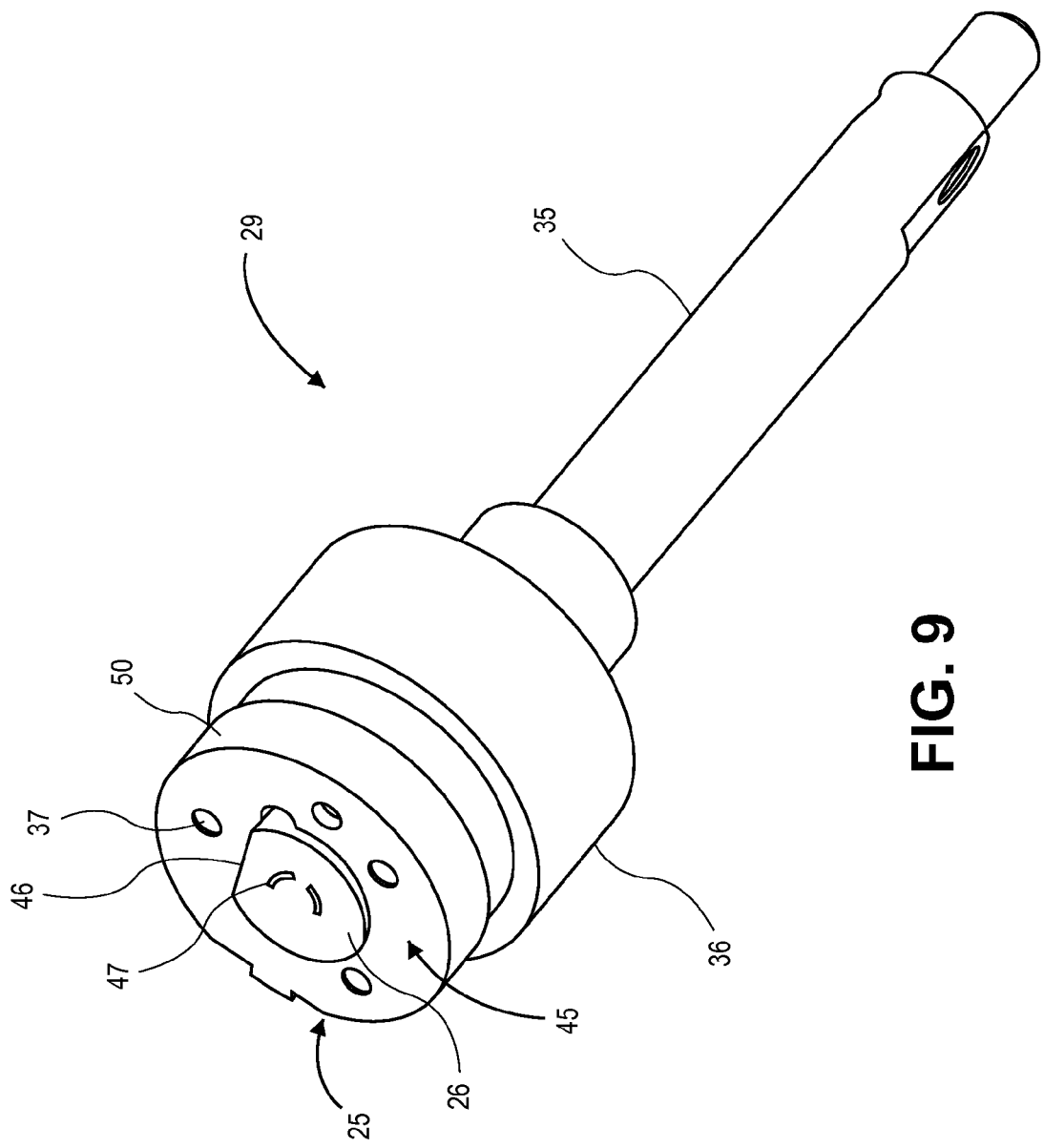
FIG. 9 is a top perspective view of the rotor assembly incorporating an alternative embodiment compliance assembly.

In accordance with the present invention, at least one of, or both, the stator face and the rotor face 26 is coated with the tribological material. In one specific embodiment, in certain conditions, applying the tribological coating to the stator face 22 of the stator boss 27 has been found particularly advantageous to provide a stronger, longer lasting fluid-tight seal at the rotor-stator interface (FIG. 8). For example, for high fluid pressure applications (i.e., greater than about 18 Kpsi, higher axial compression forces between the rotor face 26 and stator face 22 are necessary to maintain a fluid-tight seal. When the valve is set (i.e., when the pressure adjuster nut is adjusted until a rate of decay is achieved, typically this rate is 0.3 uL/min. Fluid pressure is applied to the valve through the stator port(s) rotor seal groove(s). Once the valve holds the required amount of pressure (15-25 Kpsi in this instance) at the 0.3 uL/min leak rate, the valve is "set". The high pressure applied to the seal by a spring assembly 30 (that includes an adjuster nut 31 and spring washers 32 (FIG. 8)) occasionally causes the coating seal to be indented by the circumferential edge portion of the stator boss 27. Thus, if the rotor face 26 is coated (e.g., the rotor face alone or in combination with the stator face), inconsistent results and damage components have been observed in these instances due to cracking of the coating, or delaminating at the edge portion as the valve is actuated.

It is believed that this indentation causes the coating to "flake-off" or delaminate from the rotor seal in the area of the indentation as the valve is actuated. As this coating is removed, the debris, and possibly the uncoated metal, has been observed to score the remaining coating, degrading the integrity of the coating on the stator boss, and causing the coating on the stator to fail. Once this degradation commences, the fluid-tight seal at the rotor/stator interface will fail in holding pressure.

When only the stator face is coated with the tribological coating, under these high pressure applications, this degradation is not observed. It will further be noted that at lower pressures (3-6 Kpsi), it is believed that both the stator and rotor seal could be coated (DLC or otherwise) and provide a good seal, since hard-on-hard valves work at these pressures. Since these pressures applied to the seal would be lower, the rotor seal is less likely to be indented and cause the coating to fail.

Referring now to FIGS. 1-5 and 8, a typical shear valve assembly 20 is shown and described. Briefly, as best illustrated in FIG. 8, the shear valve assembly typically includes a housing assembly 33 (essentially comprised of a valve housing and a stator ring) upon which a rotor assembly 29 is rotatably disposed therein. The rotor assembly 29 includes a drive shaft 35 and a distally disposed head assembly 36 that is configured to seat the rotor device 25 thereon. To promote force concentration and the ability of the rotor device to pivot atop the head assembly 36, the head assembly includes a raised platform or pad 34 upstanding slightly from a distal surface 38 thereof. This upstanding shaft pad 34 is preferably disk-shaped, having a substantially planar seating surface 39 that is configured to seat directly against a contact surface 40 of the rotor device 25. It will be appreciated, however, that FIGS. 5, 7 and 8 are illustrated with a thin compliant element or shim member 44 disposed there between which will be described in detail below.

The diameter of this upstanding pad 34 is preferably less than that of the contact surface 40 of the rotor device. However, the diameter is also preferably not less than a range of about 45% that of the rotor device, such that the smaller diameter allows minute teetering of the rotor device so that the rotor face and stator face will be in full contact therebetween. Accordingly, as will be described in greater detail below, the contact surface 40 of the rotor device 25 and seating surface 39 of the upstanding shaft pad 34 need not be in substantially flush contact with one another. In one specific embodiment, the diameter of the upstanding pad may be in the range of about 0.200" to about 0.368", and more preferably about 0.230", while the diameter of the rotor device may be in the range of about 0.600" to about 0.625".

Figure 6:
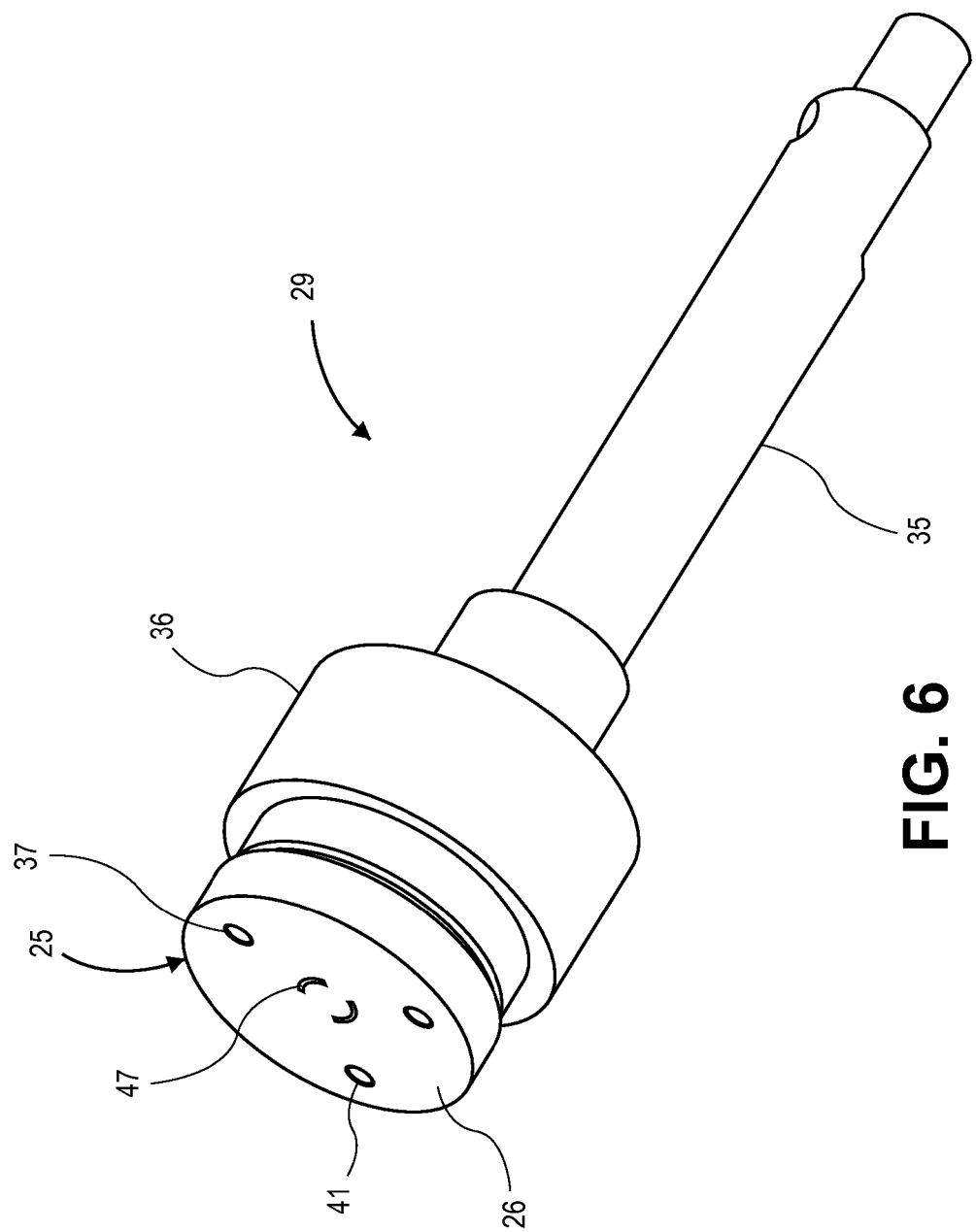
FIG. 6 is an enlarged, top perspective view of the rotor assembly of FIG. 5.
Figure 7:
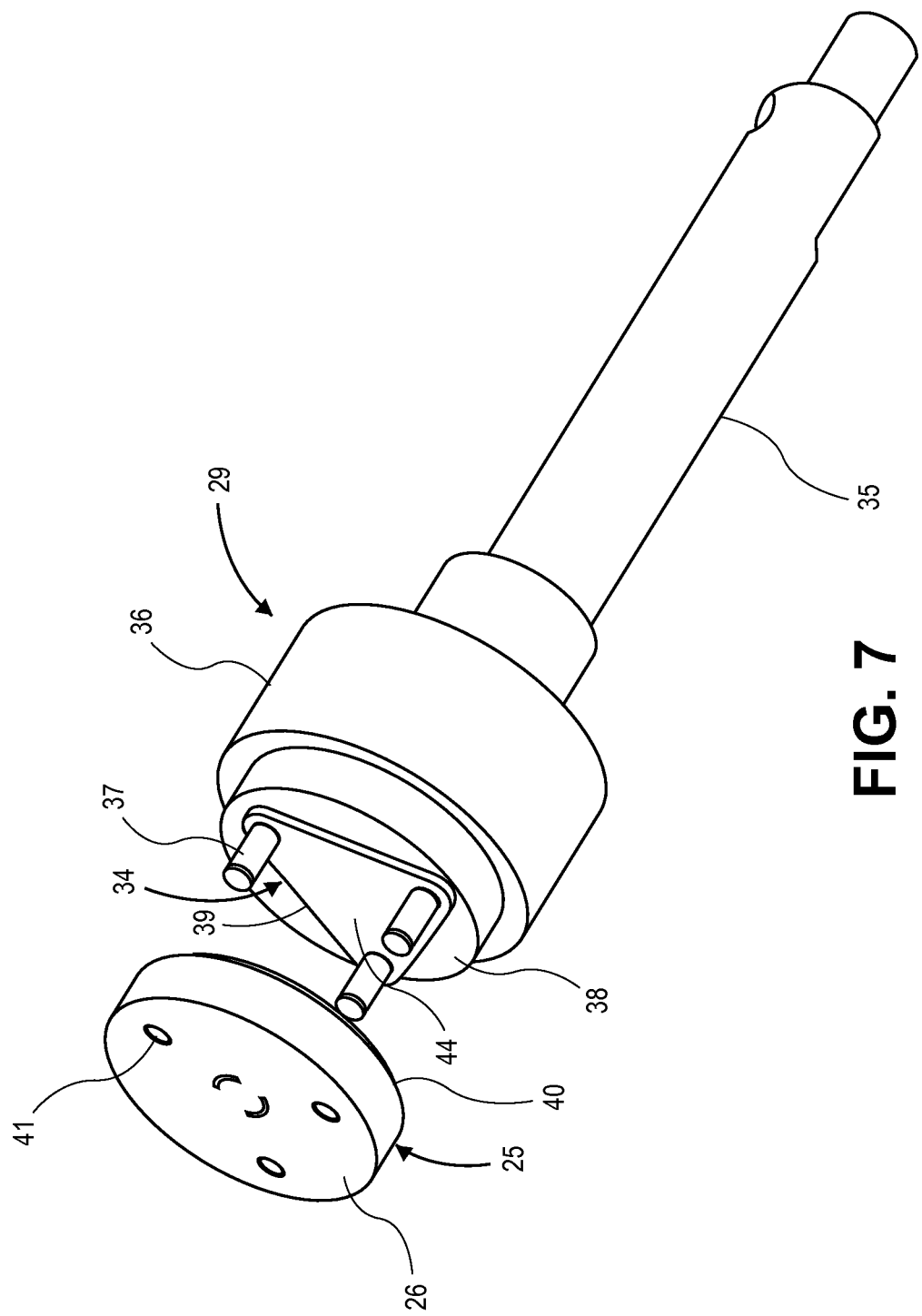
FIG. 7 is a partially exploded, top perspective view of the rotor assembly of FIG. 6, incorporating a compliance assembly constructed in accordance with the present invention.

In a typical configuration, three strategically oriented dowel pins 37 extend distally from the distal surface 38 of the head assembly 36 (FIGS. 5-7). These dowel pins 37 are slideably received in corresponding through-holes 41 in the disk-shaped rotor device 25 that function to mount and align the rotor device 25 relative to the drive shaft 35. Furthermore, these dowel pins 37 enable torque transfer, and thus, rotation of the rotor device 25 as the drive shaft 35 is rotated about the rotational axis.

The stator device 21 is mounted to a distal portion 42 of the housing assembly 33, via nuts 43, in a manner positioning the stator face 22 of the stator boss adjacent to and in contact with the rotor face 26 of the rotor device 25. To generate the compressive force between the rotor device 25 and the stator device 21, at the rotor-stator interface, the spring assembly 30 is cooperates between the housing assembly 33 and the head assembly of the drive shaft 35. Briefly, a pressure adjuster nut 31 is threadably mounted to the proximal portion of the housing assembly 33. As the distal end of the pressure adjuster nut compresses a spring stack (i.e., the stack of spring washers 32) against the head assembly 36 the rotor device 25 is compressively urged against the stator boss 27. Newer microfluidic valves have recently been developed that incorporate pressure adjuster assemblies for ultra-high pressure fluid applications that offer significant valve rebuild advantages. These assemblies are disclosed in our U.S. patent application Ser. No. 12/815,265 to Tower et al, filed Jun. 14, 2010, entitled "REBUILDABLE MICRO-FLUIDIC VALVE ASSEMBLY", which is incorporated by reference in its entirety.

Referring now to FIGS. 3-7, and in accordance with the present invention, both the stator device 21 and the rotor device 25 are composed of a metallic material, forming a metal-on-metal stator-rotor interface. The tribological coating (preferably a DLC) isolates true metal-to-metal contact, of course, functioning to form a fluid-tight seal under higher pressure situations. As indicated above, for applications greater than about 15 Kpsi, the stator face 22 is preferably coated, while for applications ranging from about 3 Kpsi to less than about 6 Kpsi, either the stator face 22, the rotor face 26 or both faces can be coated.

In this coated, metal-on-metal configuration, due to the rigidity and hardness of these shear face valve components, it is highly beneficial to orient the substantially planar faces of the stator device and the rotor device substantially parallel to one another. However, while such substantially parallel orientation is attainable, this may be cost prohibitive, and thus not be practical. Due to the collective stack up of component tolerances, the metal rotor face 26 may not seal flatly or substantially parallel and flush to the substantially planar stator face, or the stator may not be perfectly planar in the first place.

Therefore, in accordance with another aspect of the present invention, the rotor assembly 29 incorporates a rotor face compliance assembly 45 that cooperates with the substantially planar rotor face 26 to orient it substantially parallel to the stator face 22. The compliance assembly 45, for example, includes a compliant element (e.g., a shim member 44 of the embodiment of FIGS. 5-8, or a support device 50 of the embodiment of FIGS. 9-13) disposed between the head assembly 36 and the rotor device 25 (or at least metallic or ceramic portion thereof, such as the rotor element 46 of the embodiment of FIGS. 9-13) that is compressible in a manner enabling the substantially planar rotor face 26 to orient substantially parallel to the stator face 22. In one particular embodiment, as above-mentioned, the compliant element is provided by a compliant shim member 44 disposed between the distal seating surface 39 of the raised platform 34 and the contact surface 40 of the rotor assembly 29. Hence, upon compression of the head assembly 36 against the rotor device 25, and thus, compression of the rotor face against the stator face, the substantially more compliant shim 44 will be caused to compress in a manner that seats the rotor face more flush and parallel against stator face. As mentioned above, thus, the need for a completely flush seat between the contact surface 40 of the rotor device 25 and the seating surface 39 of the upstanding shaft pad 34 is not as necessary to ensure a flush, sealed contact between the rotor face and the stator face.

The diameter of the shim member 44 is preferably less than that of the contact surface 40 of the rotor device 25, but must incorporate through-holes 48 that are strategically aligned to receive and cooperate with the dowel pins 37 that extend distally from the distal surface 38 of the head assembly 36 (FIGS. 5-7). Similar to the rotor device 25, these dowel pins 37 are slideably received in the corresponding through-holes 48 in the shim 44 to mount, secure and align the shim 44 relative to the head assembly 36.

As best shown in FIGS. 5, 7 and 8, the shim may be comprised of many different shapes. For instance, the shim may be a conventional circular shape (FIG. 8), or may be an efficient, minute triangular shape (FIGS. 5 and 7).

The material composition of the shim 44 should have sufficient structural integrity to withstand the substantial compressive forces applied between the rotor device and the stator device. However, the material must also be sufficiently compliable to enable the rotor face to seat substantially flush against the stator face, during operative compression. The compressive modulus, k, for instance, is preferably in the range of about 250 to about 300 kpsi. In one particular embodiment, the material composition of the shim 44 may be comprised of Polyethylene Terephthalete Glycol (PETG), Polyester or Polycarbonate, having a thickness in the range of about 0.010" to about 0.040".

Figure 10:
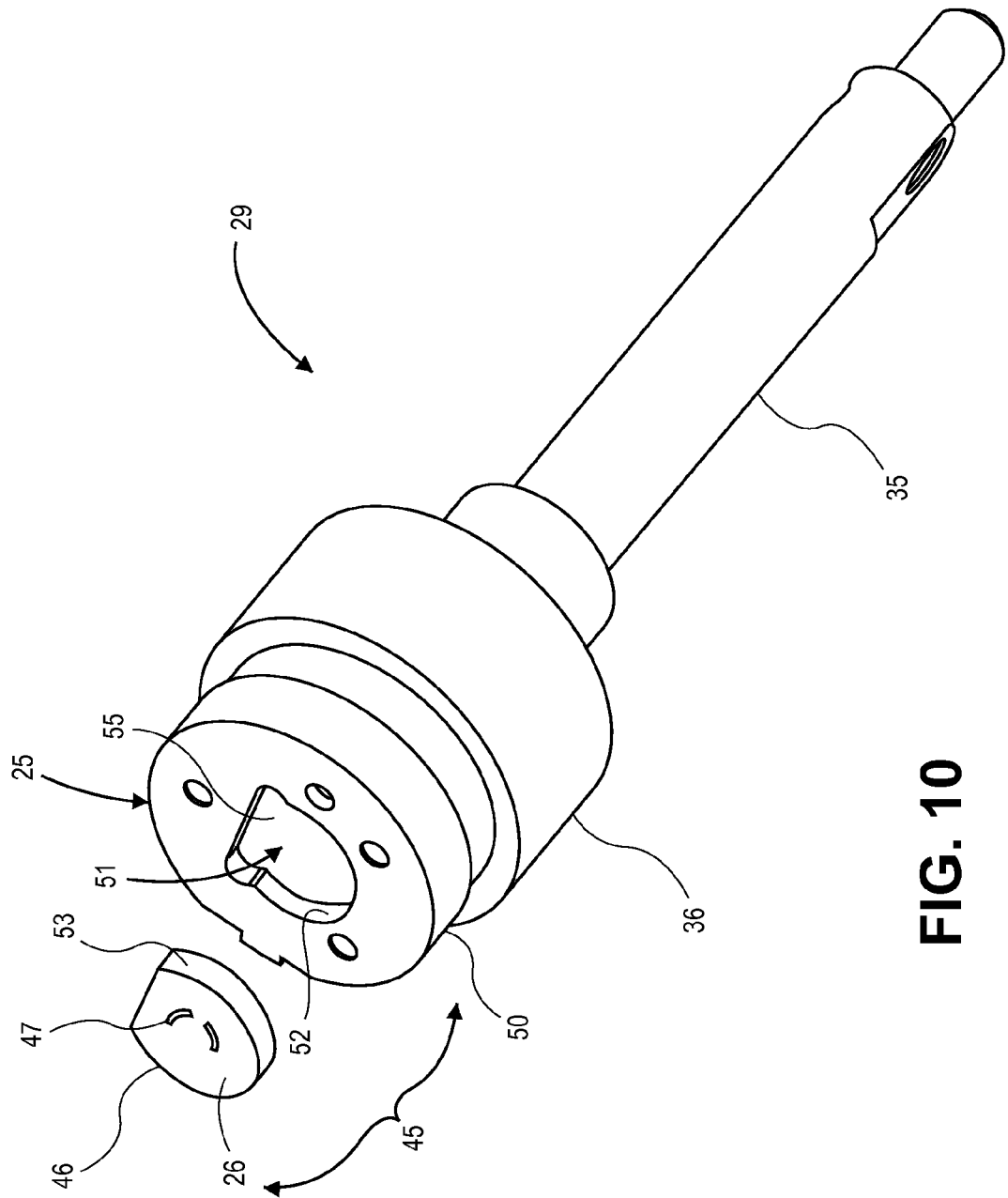
FIG. 10 is a partially exploded, top perspective view of the rotor assembly and compliance assembly of FIG. 9.
Figure 11:
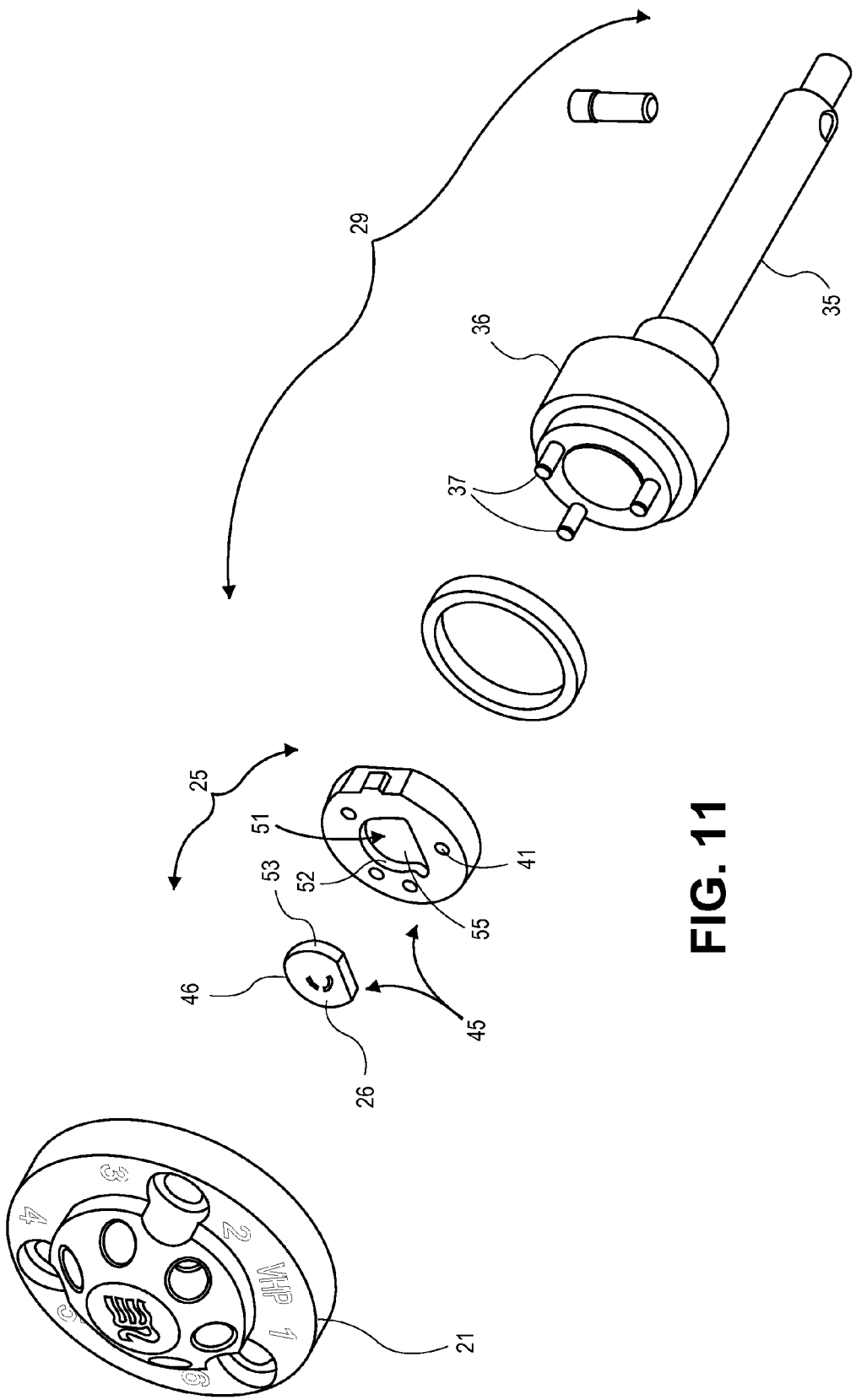
FIG. 11 is an exploded, top perspective view of the rotor assembly and compliance assembly of FIG. 9, together with the stator element.
Figure 12:
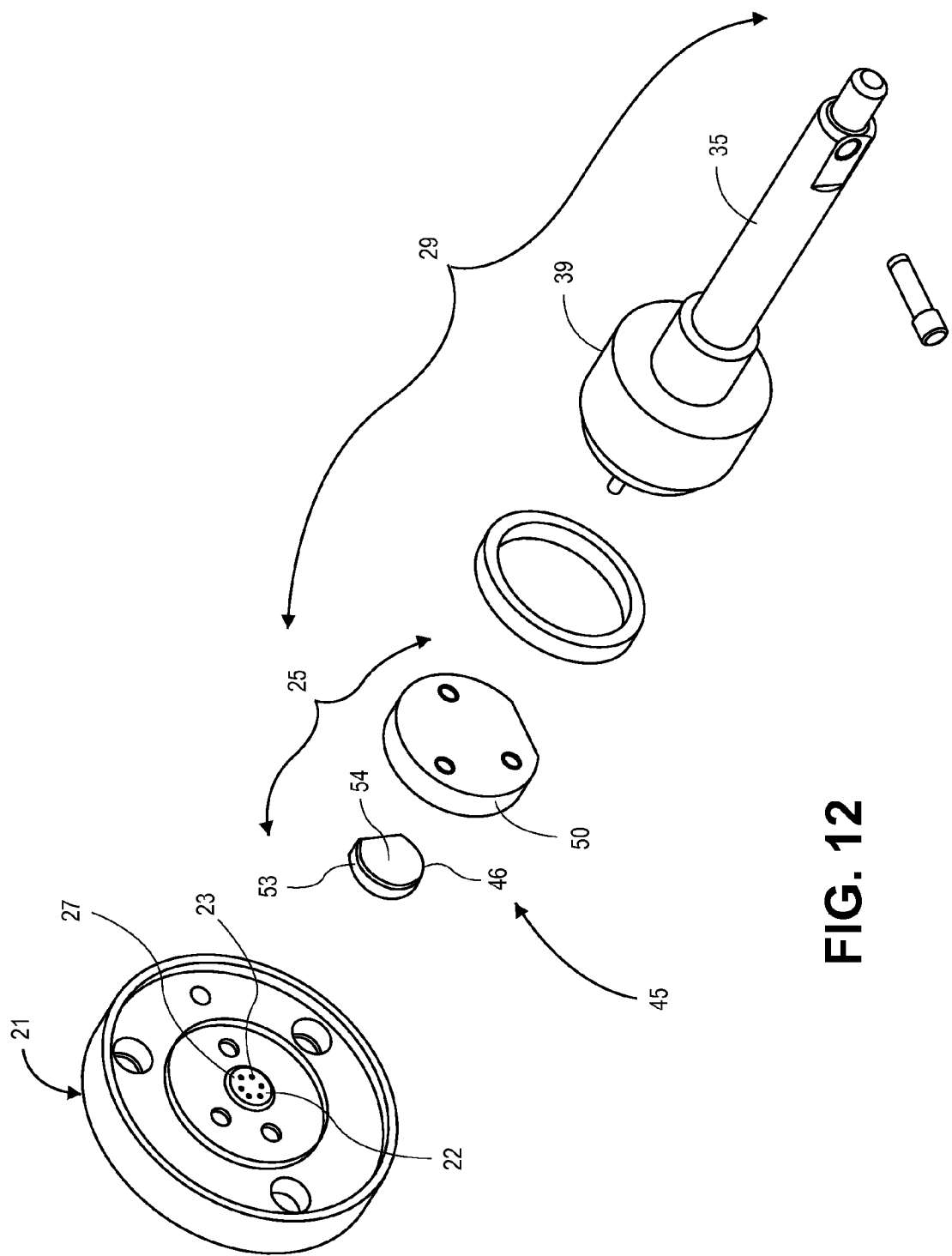
FIG. 12 is an exploded, bottom perspective view of the rotor assembly and compliance assembly of FIG. 10.

In another specific embodiment of the compliance assembly 45, as illustrated in FIGS. 9-12, the rotor device 25 is comprised of a metallic or ceramic (insertable) rotor element 46 that is received and supported by a compliant support device 50. In this embodiment, the support device 50 functions as the compliant element, and thus, provides a compliant backing against the back side (i.e., the proximal face) of the inserted rotor element 46. FIGS. 10-12 best illustrate that the metallic rotor element 46 is preferably disk-shaped having the distal facing, substantially planar rotor face 26 containing the rotor channels 47.

The support device 50 is for the most part is shaped similar to a typical rotor device 25, such as that in the embodiment of FIGS. 5-7. The distal face of the support device, however, defines a receiving socket 51 with a peripheral interior sidewall 52 formed and dimensioned for press-fit receipt of the outer circumferential or peripheral wall 53 of the rotor element 46 until a proximal face 54 thereof contacts and is supported by the distal socket face 55 of the receiving socket 51.

By providing a compliant backing material, at least in the axial direction, upon the application of a compressive force between the rotor device 25 and the stator face 22, the contacting surfaces of the support device 50 should have some compliance or compression. Such compressive compliance allows the substantially planar rotor face 26 to slightly relocate to an orientation that is substantially parallel to the substantially planar stator face. In other words, the compliant material will "move" or compress, due to contact with the backside contact surface of the metal rotor element, allowing the polymer to absorb any misalignment between the rotor face and the stator face of the stator boss. The rotor face 26 can then seal and mate flat against and substantially parallel to the stator boss face 22.

Figure 13:
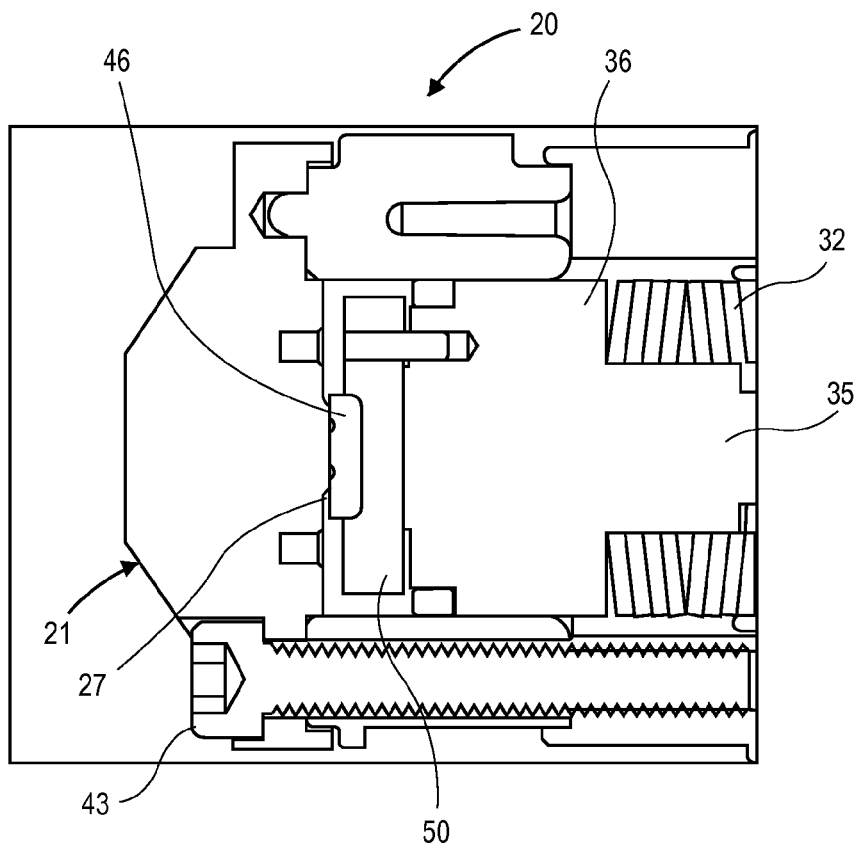
FIG. 13 is an enlarged, fragmentary, side elevation view, in cross-section, of the micro-fluidic valve assembly of FIG. 1, incorporating the compliance assembly of FIG. 9.
Figure 14:
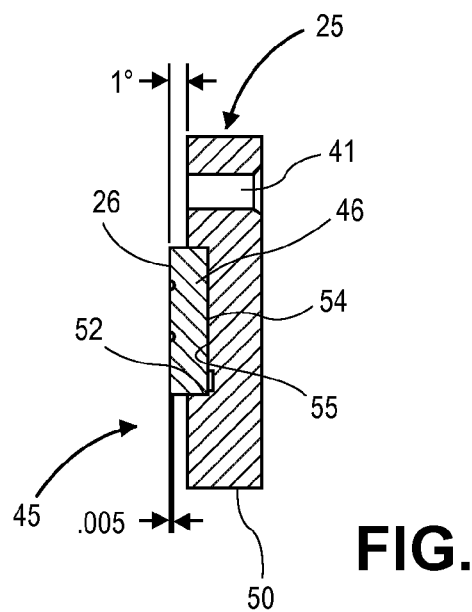
FIG. 14 is a side elevation view, in cross-section, of the compliance assembly of FIG. 13.
Figure 15:
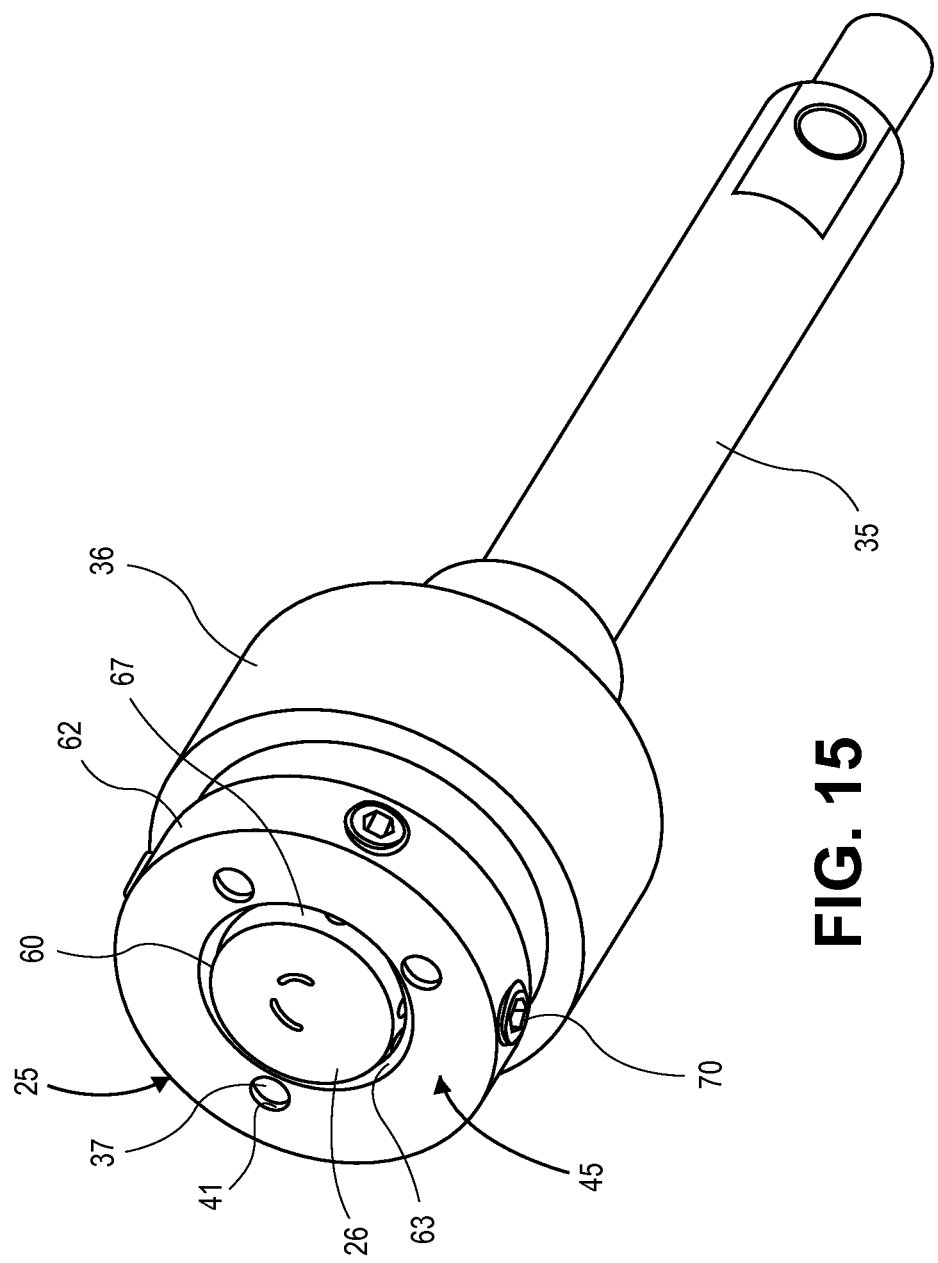
FIG. 15 is a top perspective view of the rotor assembly incorporating another alternative embodiment compliance assembly.

In one specific embodiment, the support device 50 is preferably about 0.100" to about 0.200" thick, has a compressive modulus, k, in the range of about 4000 to about 5000 kpsi, and is composed of a polymer material exhibiting high tensile and compressive strength. Such a compliant material exhibiting these other properties, permits minute compliance, while further permitting transfer of the high compressive forces in the axial direction to the rotor face 26 of the rotor element 46. As best illustrated in FIGS. 13 and 14, compliance on the order of about 1° or about 0.005" at the circumferential edges of the rotor element is attainable.

The polymer material used can be changed for a variety of applications. Depending upon whether the application is for the lower region of what is considered a high lower pressure application (e.g., 3-6 Kpsi), a softer unfilled polymer, such as PEEK™ or Nylon, may be applied. In contrast, for higher pressure applications (e.g., 15-25 Kpsi), a carbon filled polymer material may be necessary which significantly increases the polymers tensile and compressive strength.

One such high strength polymer support material is an engineered blend of PEEK™ with carbon fibers (e.g., a 20%-30% carbon PEEK™ blend). This polymer material is carbon filled, yielding the requisite high tensile and compressive strength. Thus, due to the high pressures of the spring washers 32 needed to seal the valve, this PEEK™ blend is currently the preferred material. It will be appreciated, however, that other polymer based materials, or even a higher strength elastomer could be used.

Turning now to FIGS. 10 and 11, the disk-shaped rotor element 46 is generally keyed. Not only does this aligned the rotor face 26 relative to the drive shaft 35, but also functions to facilitate torque transfer to the rotor element during the rotation of the support device 50. For ease of machining, the rotor element 46 is "D" shaped and the female receiving socket 51 is a modified "D" shape where the corners of the flat have been relieved for the radius of an end mill. The two parts are assembled by using an arbor press. The arbor press press-fits (0.002" press fit) the two parts together. It will be appreciated, of course, that the outer peripheral edges may be any shape that enables the metal seal insert to press-fit into the polymer backing.

Referring now the embodiment of FIGS. 16-24, the rotor assembly 29 incorporates an alternative embodiment rotor face compliance assembly 45 that enables the rotor face to "rock" and/or "pivot" to an orientation that allows the opposed rotor face and stator face to seal and mate flushly against one another on the stator boss 27.

In this configuration, in a simplified description, a disk-shaped metallic rotor element 60 (similar to that provided the embodiment of FIGS. 16 and 20-23) is pivotally seated atop a ball bearing 61, which in turn, is seated atop a distal end of the head assembly 36 of the drive shaft 35. Accordingly, as a compressive force is applied to the drive shaft 35, the force is transferred, via the ball bearing 61, to the rotor element 60. Upon increasing pressure between the adjacent, and opposed contact, at the rotor/stator interface, the rotor element 60 is caused to minutely rock or pivot in an effort to reorient and align the rotor face substantially parallel to the stator face.

Figure 16:
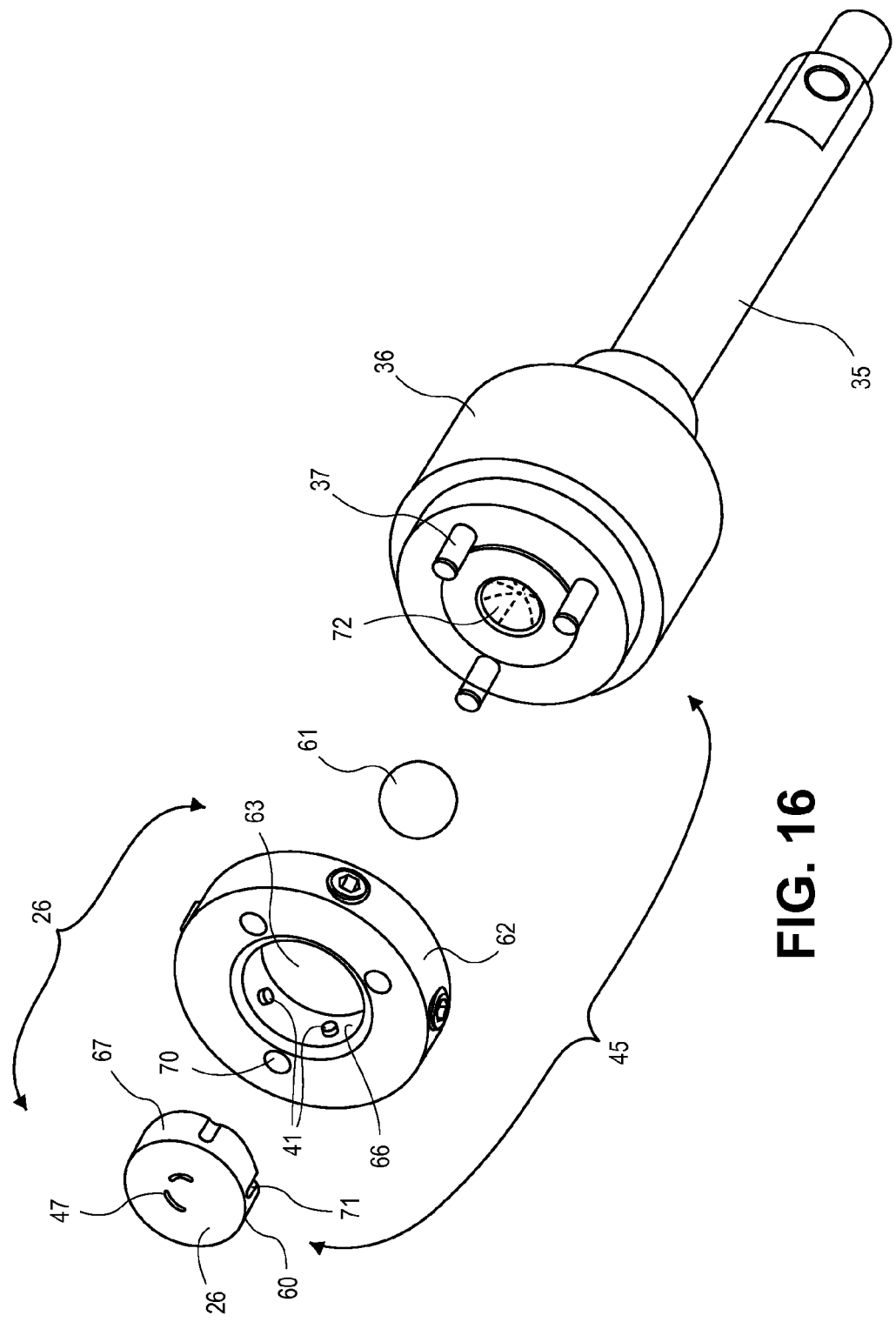
FIG. 16 is an exploded, top perspective view of the rotor assembly and compliance assembly of FIG. 15.
Figure 17:
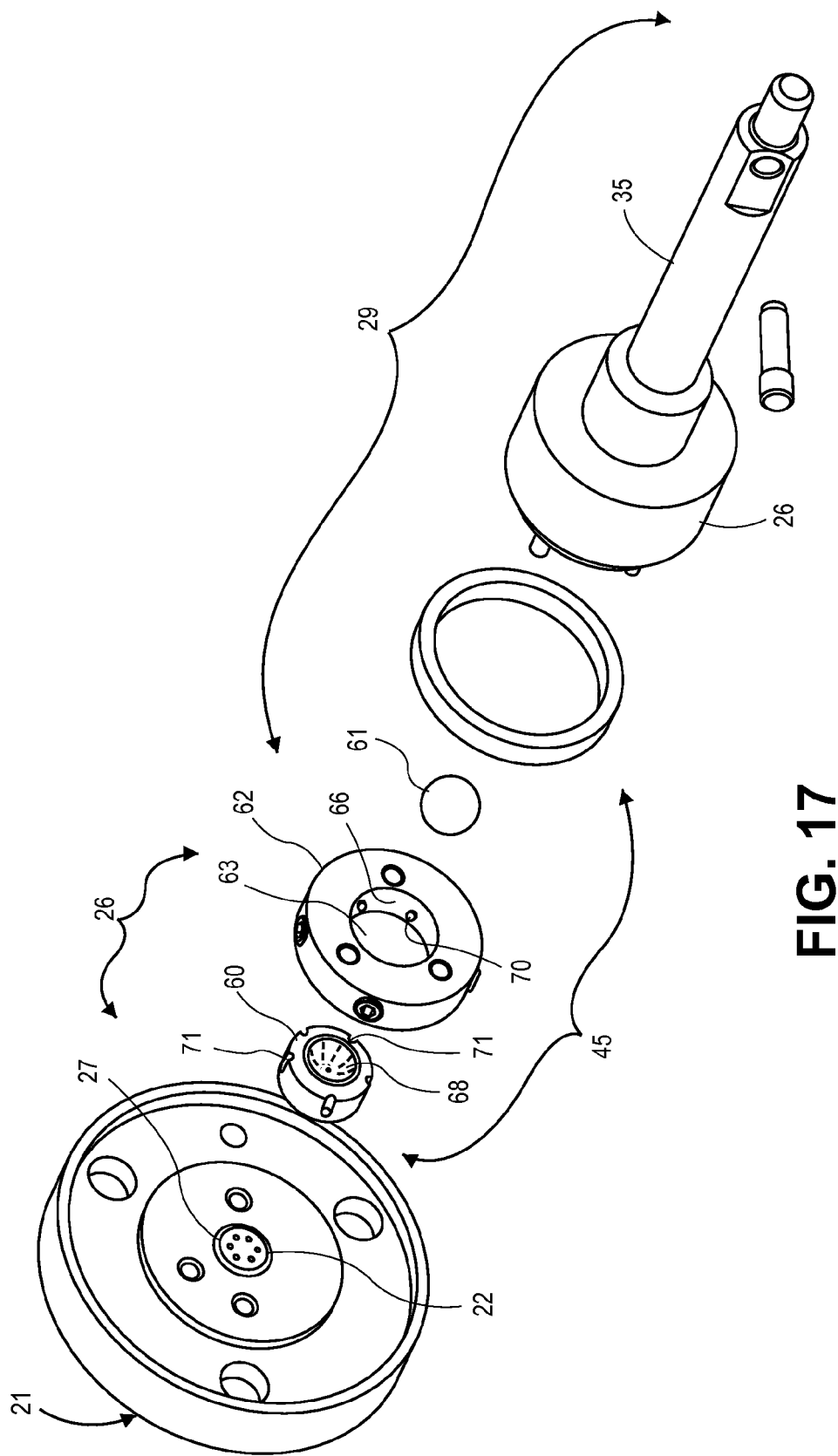
FIG. 17 is an exploded, bottom perspective view of the rotor assembly and compliance assembly of FIG. 15.

To facilitate support of the pivoting rotor element 60, a drive ring 62 is provided that is also shaped similar to the conventional rotor device it replaces. FIGS. 16 and 17 best illustrate that this drive ring includes an axially extending receiving aperture 63 formed for axial receipt of the rotor element 60 in a manner allowing the insert to "float" axially therein, while at the same time securing the rotor element rotationally to the drive ring 62 for rotation about the rotational axis.

Accordingly, the inner diameter of the inner sidewall 66 that defines the receiving aperture 63 is slightly larger than the diameter of the outer circumferential wall 67 of the rotor element 60 to permit minute pivotal movement thereof. The clearance, for example, between the outer diameter of the seal insert and the inner diameter of the drive ring is about 0.020" (0.010" per side). This allows the seal insert to move laterally back and forth within the ring drive 0.010" per side.

To provide seating support atop the ball bearing 61, the proximal facing surface of the rotor element 60 includes a dome-shaped ball socket 68 that is formed, sized and dimensioned to receive a portion of the ball bearing. This configuration is further responsible for providing the pivotal support about ball bearing, and relative to the drive ring 62.

To transfer torque to the axially free floating rotor element 60, as the drive ring 62 rotates about the drive shaft axis, a plurality of guide pins 70 extend radially into the aperture 63 from the inner sidewall 66 of the drive ring 62. These radial guide pins 70 are formed for sliding axial receipt in corresponding elongated receiving slots 71 extending in an axial direction along the outer circumferential wall 67 of the rotor element. Accordingly, as the drive ring is rotated, the guide pins 70 transfer this rotational motion directly to the rotor element.

For precise and accurate rotational displacement and movement of the rotor element, the tolerances between the diameter of the guide pins 70 and the width of the corresponding receiving slots should therefore be relatively small. In one specific embodiment, for example, the tolerance between the diameter of guide pins and the width of the slots is approximately 0.002" (0.001" per side). For instance, if the diameter of the guide pin is selected to be about 0.029"-0.031", then the width of the guide slot 71 in the rotor element should be selected to be in the range of about seal is 0.031"-0.033". Such a relatively small tolerance will enable substantially immediate transfer of the rotation of the drive ring 62, about the drive shaft axis, directly to the rotor element 60. The relative position of the rotor seal grooves 47 relative to the stator ports 23 can therefore be accurately determined.

These radially spaced guide slots 71, however, also extend radially into the outer circumferential wall 67 of the rotor element by a depth slightly greater than the radial length of the guide pins 70. This tolerance permits guide pins 70 to extend slightly into and out of the corresponding guide slots to enable the aforementioned minute lateral movement (on the order of about 0.010" per side) of the rotor device within the drive ring receiving aperture 63. Hence, as the rotor element 60 minutely pivots or rolls about the ball bearing, it also slides along the guide pins 70. This relative axial movement (as well as very minute, relative radial movement) of the guide pins 70 axially along the corresponding receiving slots 71, while also moving minutely laterally within the receiving aperture, enabling the substantially planar rotor face 26 to slightly reorient substantially parallel to the stator face 22. Thus, unlike the polymer backed support device 50 of the embodiments of FIGS. 18-21, the compliance from this pivotal embodiment is provided by the ability of the rotor element seal insert to "move" and "pivot" (i.e., roll) about the ball bearing until the rotor face is reoriented substantially parallel to, and substantially flat against the stator face 22 of the stator boss 27.

These guide pins 70 can be provided by threaded screws (as shown and illustrated) or can be molded or milled during formation of the drive ring 62. Moreover, while five guide pins 70 are shown radially spaced about the inner sidewall 66 of the receiving aperture 63, the compliance assembly 45 could function with only one guide pin and corresponding slot (albeit a more limited compliance). A minimum of three radially spaced guide pins and corresponding guide slots, however, are desired to provide an increased scope of compliance.

An opposed domed-shape socket 72 is also defined by the distal face of the head assembly 36 that is formed to similarly seat against the ball bearing 61. Preferably, this opposed domed-shape socket 72 is provided by an insertable dowel pin 73, press-fit into a corresponding passage 75 at the distal end of the drive shaft 35.

Figure 18:
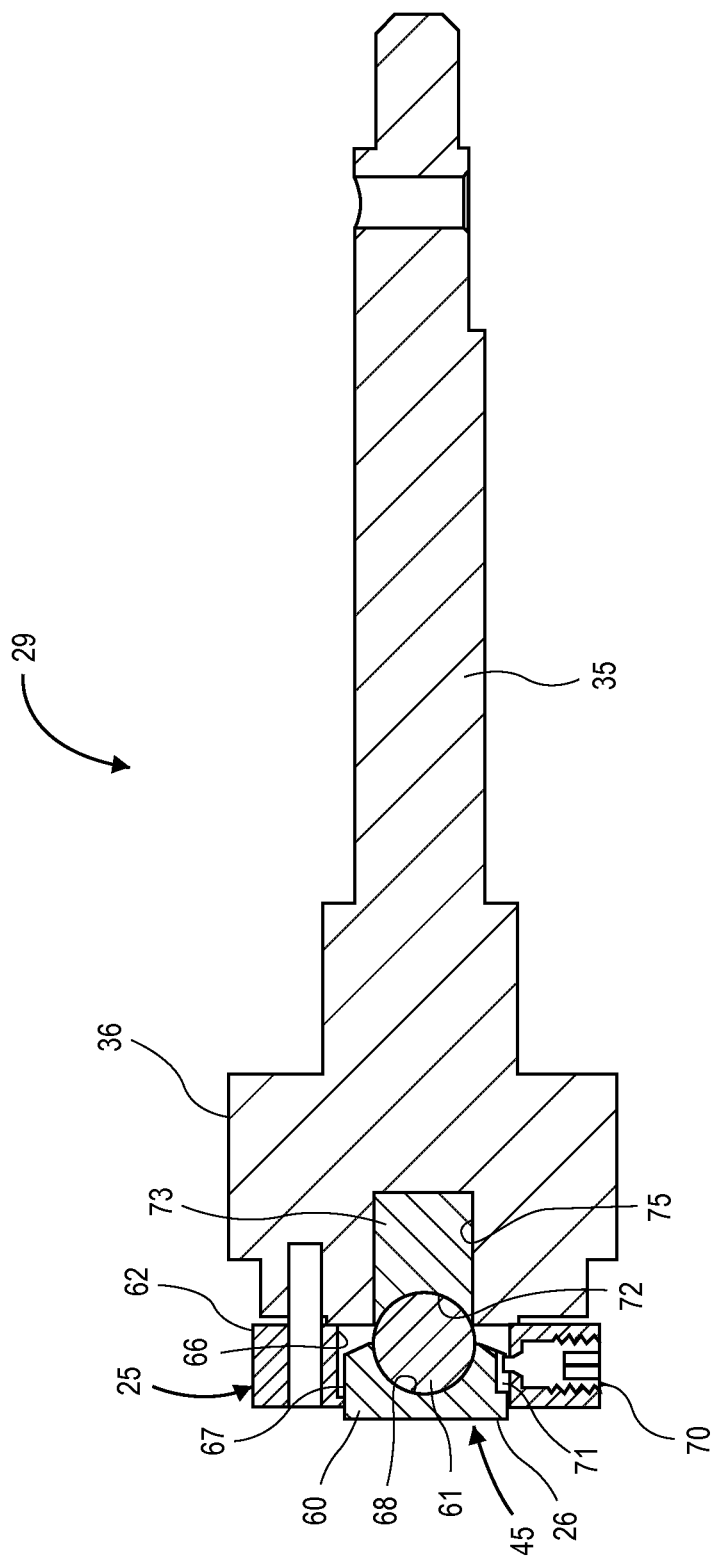
FIG. 18 is a side elevation view, in cross-section, of the rotor assembly and compliance assembly of FIG. 15.
Figure 19:
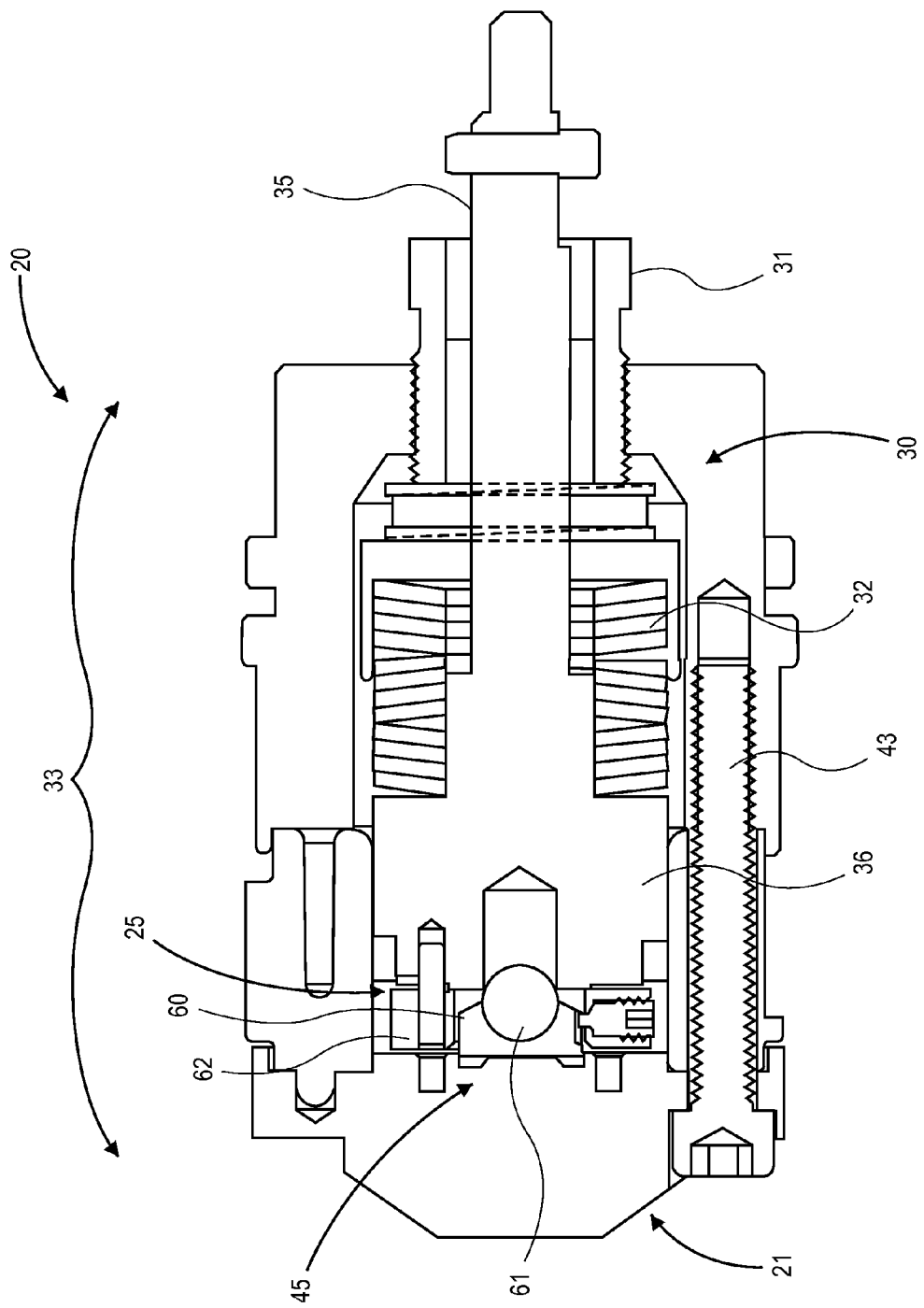
FIG. 19 is a side elevation view, in cross-section, of the micro-fluidic valve assembly of FIG. 1, incorporating the compliance assembly of FIG. 15.
Figure 20:
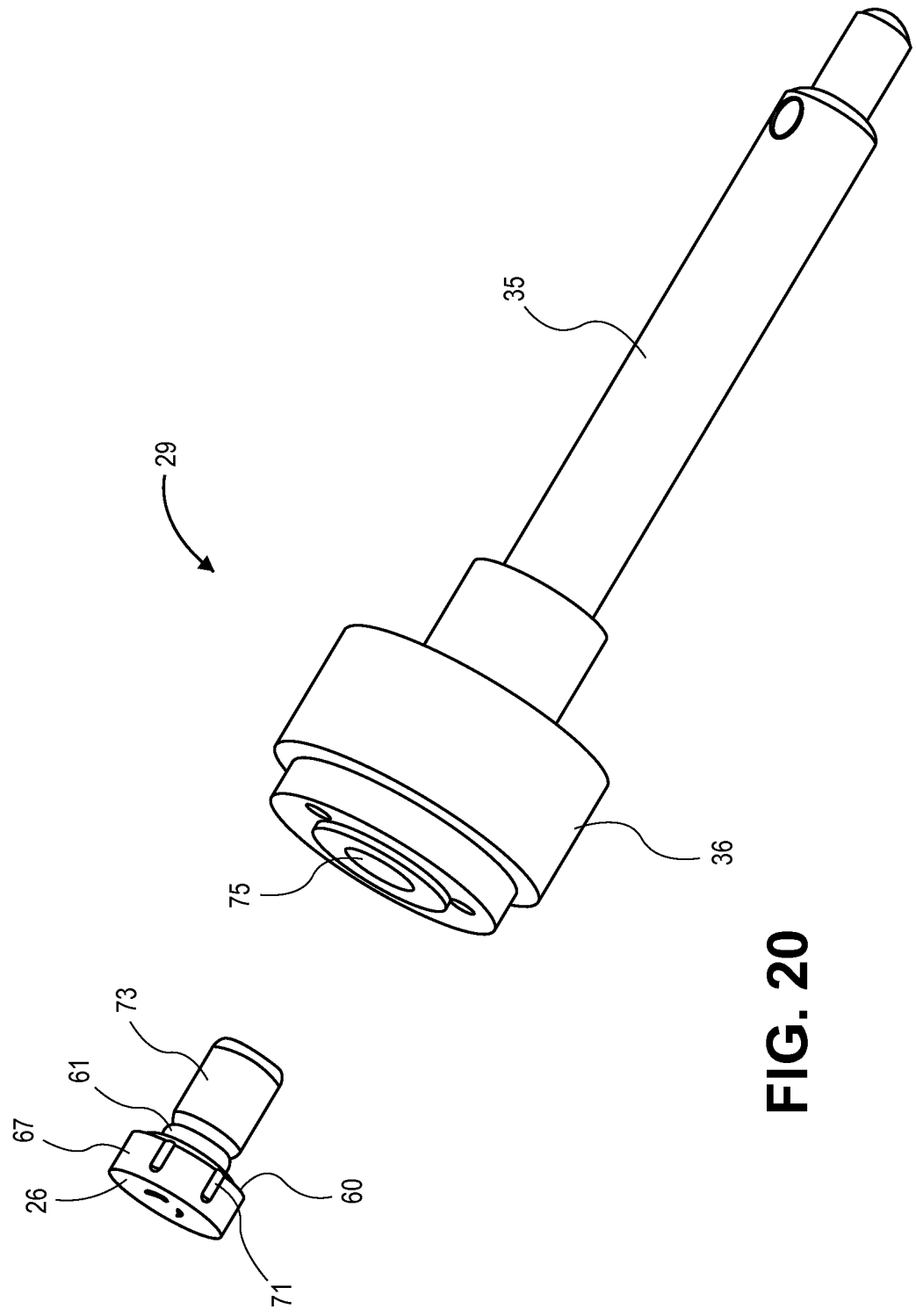
FIG. 20 is a partially exploded, side perspective view of the rotor assembly and compliance assembly of FIG. 15.
Figure 21:
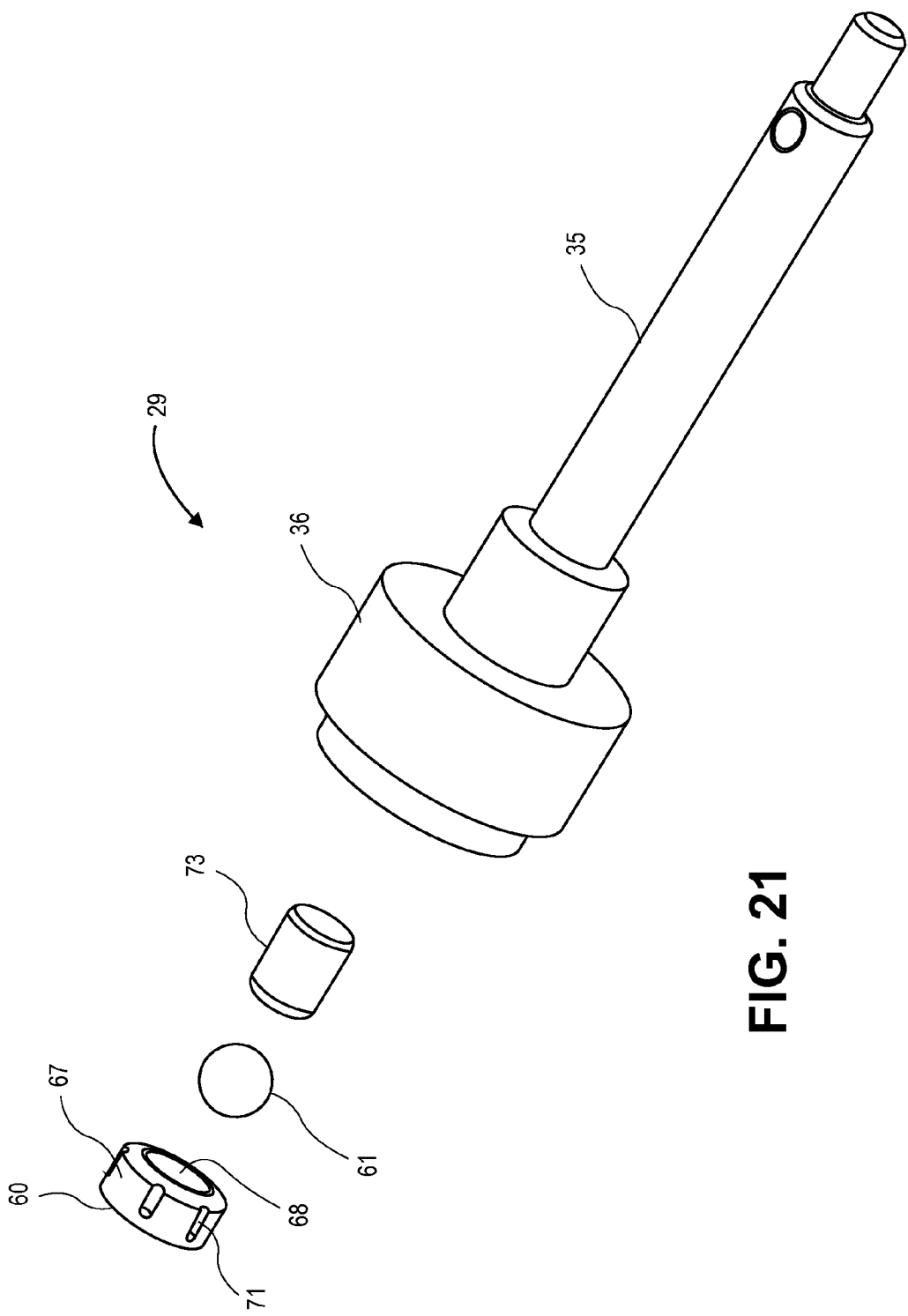
FIG. 21 is an exploded, bottom perspective view of the rotor assembly and compliance assembly of FIG. 15.
Figure 22:
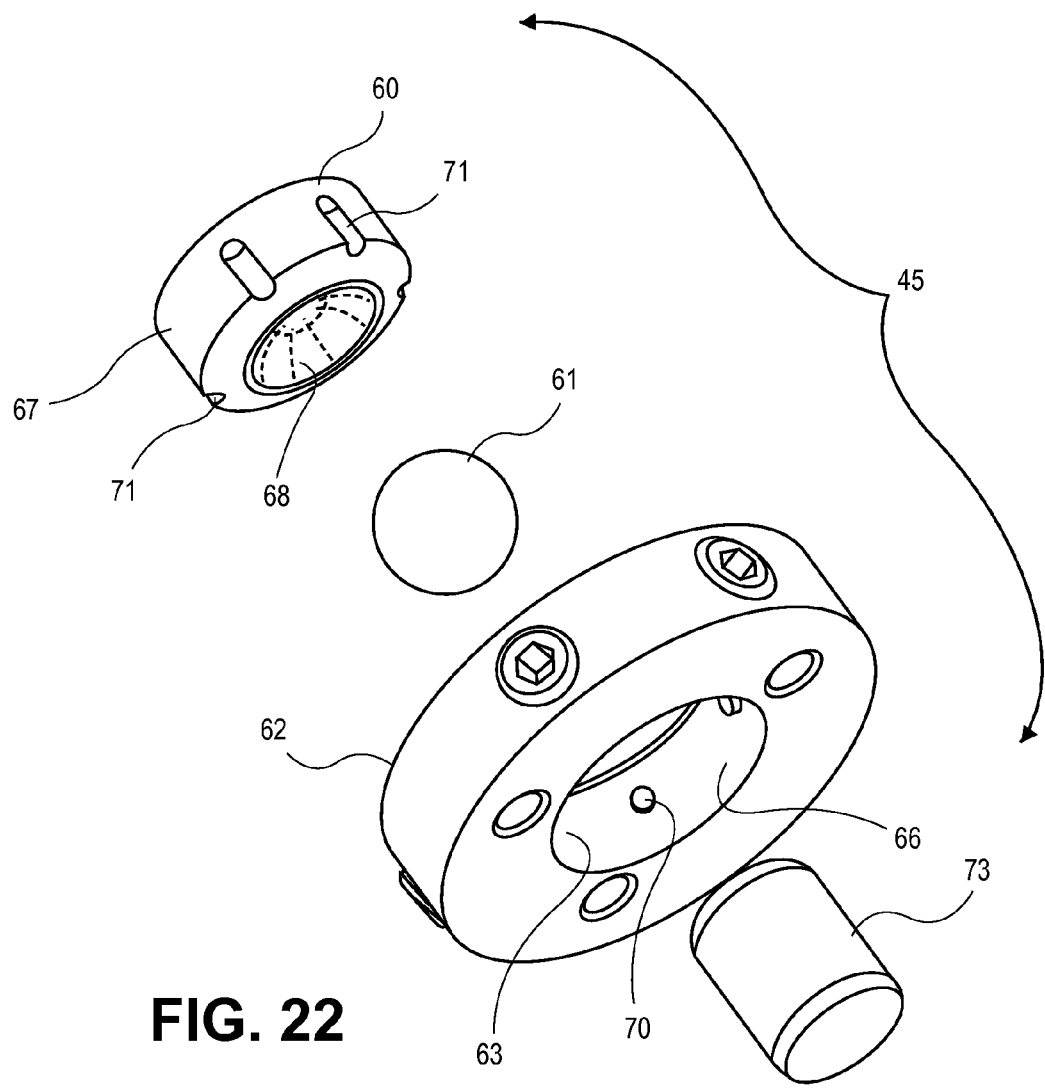
FIG. 22 is an enlarged, exploded, bottom perspective view of the compliance assembly of FIG. 15.
Figure 23:
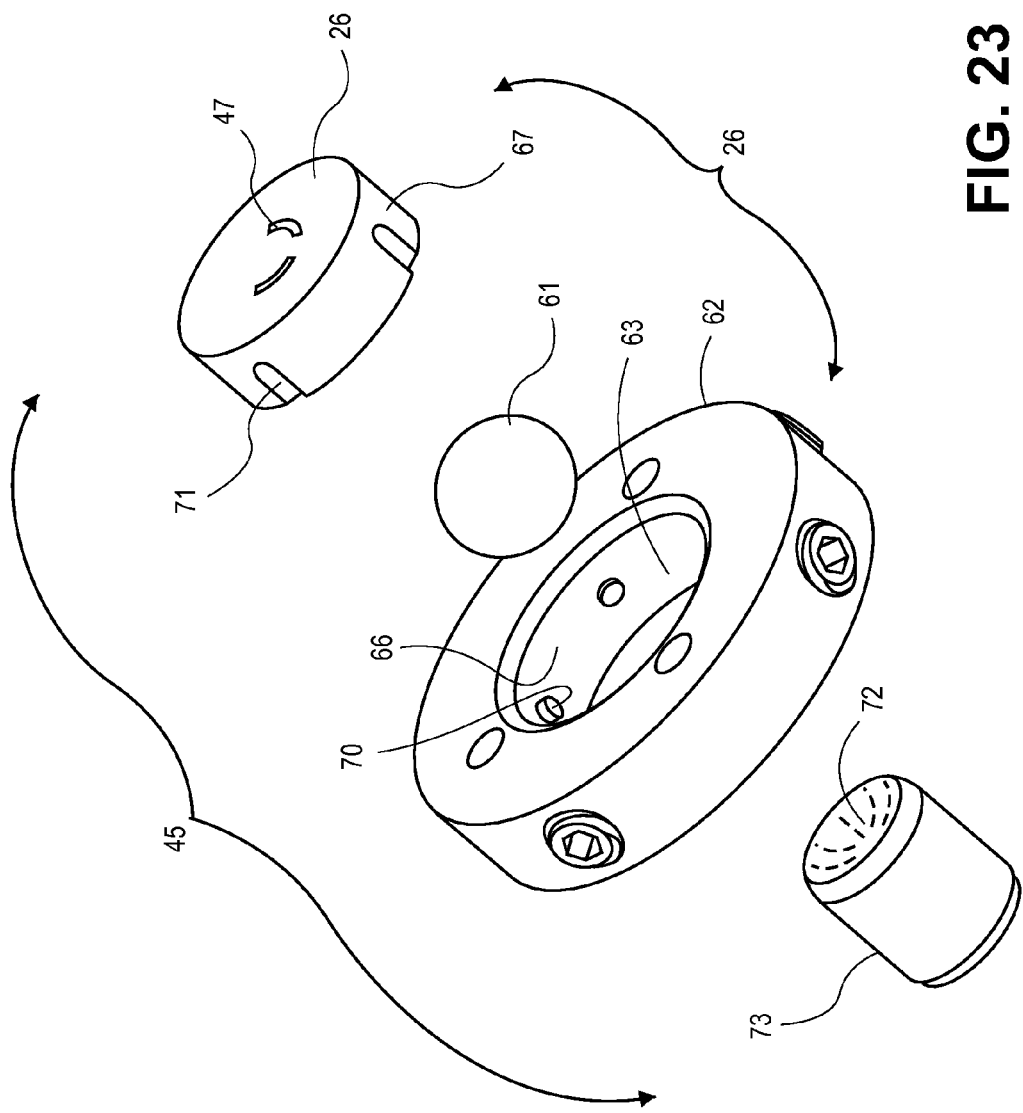
FIG. 23 is an enlarged, exploded, top perspective view of the compliance assembly of FIG. 15.
Figure 24:
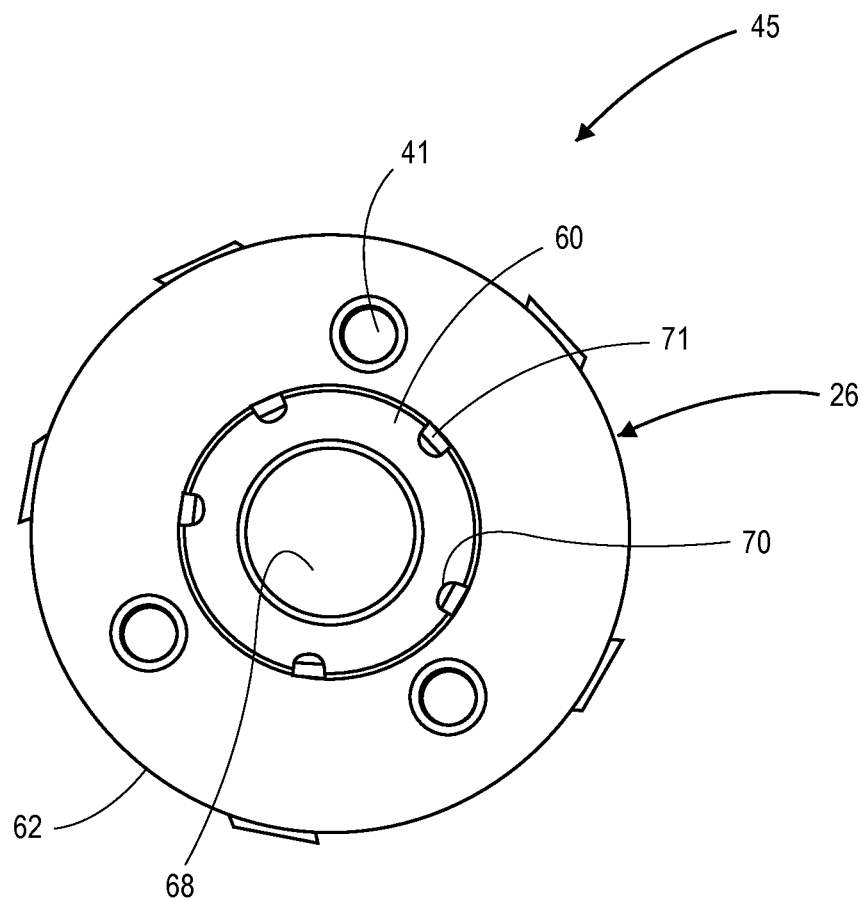
FIG. 24 is an enlarged, top plan view of the compliance assembly of FIG. 15.

Referring now to FIGS. 18 and 19, as a compression force, via spring assembly 30, axially urges the drive shaft 35 toward the stator device 21, the dowel pin 73 compresses the ball bearing 61. In turn, the ball bearing 61 transfers this axial compressive force to the rotor element 60 to form the fluid-tight seal at the rotor-stator interface.

It will be appreciated that, in order to accommodate the high compressive forces applied to the ball bearing, the diameter of the ball bearing should be at least about ½ (and preferably ⅔) the diameter of the rotor element 60. This assures that the compressive forces will be more widely distributed about the domed-shaped socket 68 of the rotor element, as compared to a more concentrated force distribution should the ball bearing be of a smaller diameter.

Figure 25:
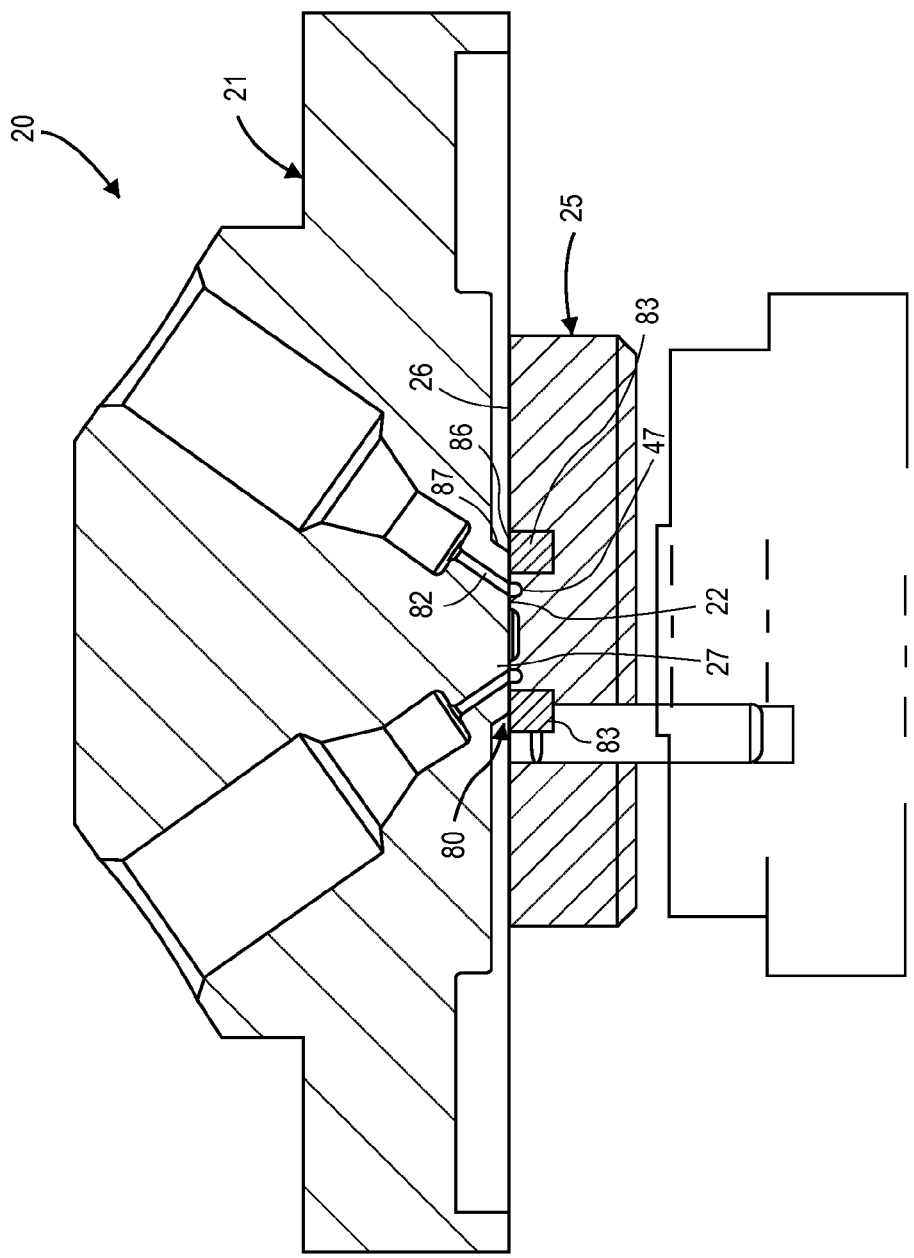
FIG. 25 is an enlarged, fragmentary, side elevation view, in cross-section, of an alternative embodiment valve assembly incorporating a polymer insert device in accordance with the present invention.
Figure 27:
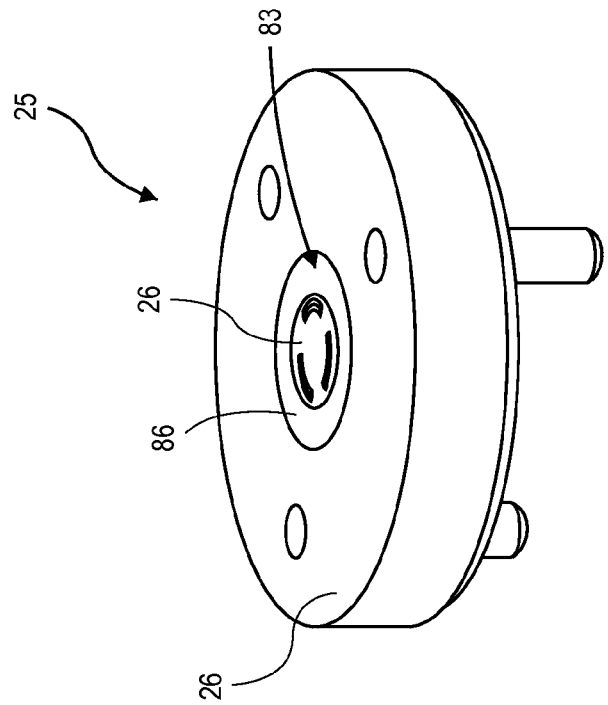
FIG. 27 is a top perspective view of the rotor device of FIG. 25, illustrating the polymer insert device press-fit into the receiving groove.
Figure 26:
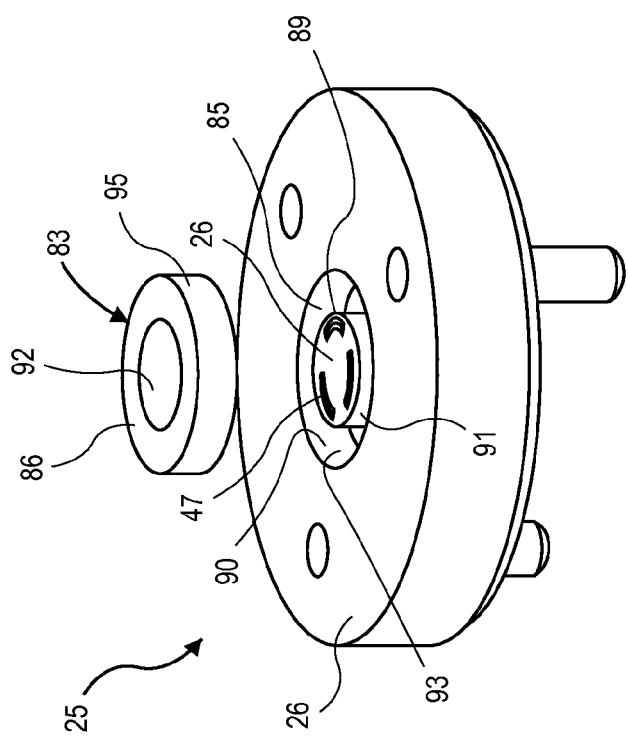
FIG. 26 is an exploded, top perspective view of the rotor device of FIG. 25, illustrating the polymer insert device prior to insertion into a receiving groove.
Figure 28:
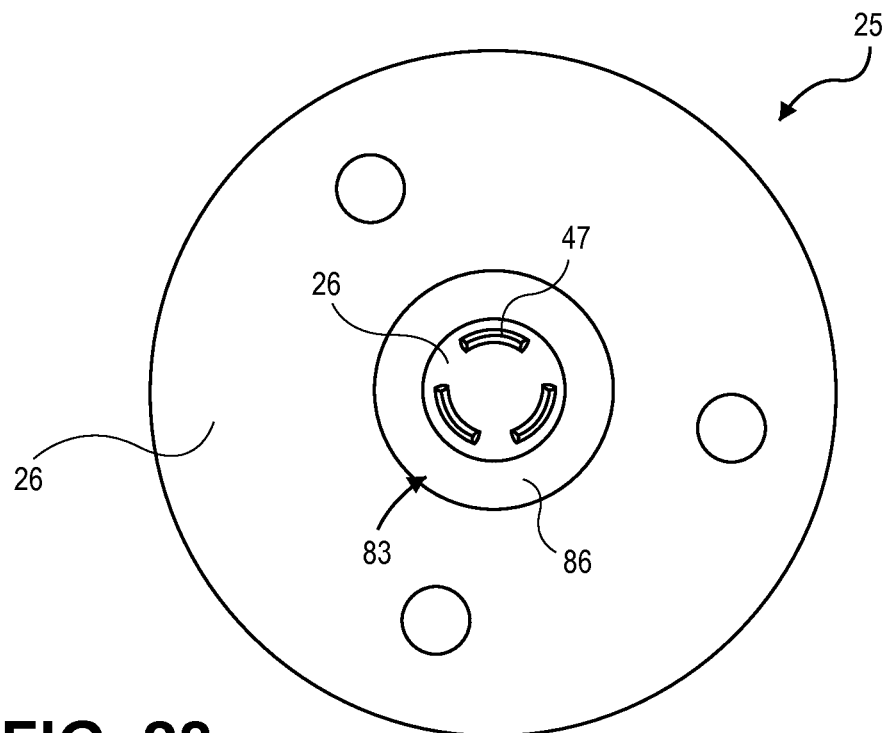
FIG. 28 is an enlarged top plan view of the of the rotor device of FIG. 27.
Figure 29:
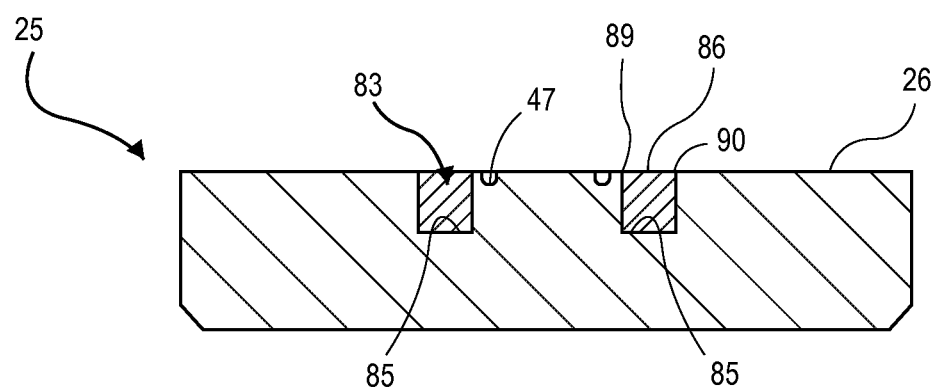
FIG. 29 is a side elevation view, in cross-section, of the of the rotor device of FIG. 28.

Through many trials of testing of tribological coatings, especially DLC coatings, under ultra high pressure (UHP) applications (e.g., 20 kpsi or higher), for the above-mentioned hard-on-hard rotary valves (e.g., metal-on-metal or ceramic-on-metal valves), increased wear has been observed in the tribological coatings, in certain contact regions, that promote premature valve failure. In one example, as best viewed in FIGS. 25 and 31, a main region where excessive wear in the tribological coating has been observed is at the outer circumferential portion 80 (particularly an outer circumferential edge 81) of the stator boss 27. This outer portion is exposed to extremely high stress and the highest velocity of the rotor seal during switching of the valve.

Consequently, cracking, flaking or delaminating of the tribological coating have been observed whereupon the removed debris, and possibly the uncoated metal, is believed to score the remaining coating, thereby degrading the integrity of the coating on the stator boss, and causing the coating on the stator to fail. Again, once this degradation commences, the fluid-tight seal at the rotor/stator interface will fail in holding pressure.

In accordance with another aspect of the present invention and as best shown in FIGS. 25-31, a rotary shear valve assembly, generally designated 20, has been developed that includes a stator device 21 and a rotor device 25. The stator device 21 defines a substantially hard, substantially planar stator face 22 and at least two or more stator channels 82 in fluid communication with the stator face 22 at corresponding stator ports, while the rotor device 25 defines a substantially hard, substantially planar rotor face 26 defining one or more rotor channels 47. One of the stator face 22 and the rotor face 26 terminates at an outer circumferential edge 81 (e.g., the stator face 22 in particular embodiment of FIGS. 25 and 31), and the other of the rotor face 26 and the stator face 22 extends radially beyond the outer circumferential edge 81 of the one stator face 22 and the rotor face 26 when the rotor device 25 is rotatably mounted about a rotational axis to the stator device 21. Such rotational mounting cooperates in a manner enabling fluid-tight, selective relative rotation between the rotor face 26 and the stator face 22, at a rotor-stator interface, between two or more rotor positions. In accordance with the present invention, the valve assembly 20 includes a polymer insert device, generally designated 83, that is formed and dimensioned for press-fit insertion into a receiving groove 85 defined in the other of the rotor face 26 and the stator face 22 (e.g., the rotor face 26 in FIGS. 26 and 27) such that the outer circumferential edge 81 of the one of the stator face 22 and the rotor face 26 (e.g., the stator face 22 in FIGS. 25 and 31) contacts the insert device 83 during the relative rotation between the two or more rotor positions. The insert device 83, in particular, defines an exposed contact face 86 that has an insert inner diameter less than that of the outer circumferential edge 81 (e.g., the stator face 22 in FIG. 31), and an insert outer diameter that is greater than that of the outer circumferential edge.

Accordingly, the hard-on-hard (e.g., metal-on-metal or metal-on-ceramic) contact between the rotor face 26 and the stator face 22, at the circumferential edge 81, is essentially supplanted with contact between the polymer insert device 83 and the hard circumferential edge. The rotating contact between the metallic and/or ceramic circumferential edge 81 with the exposed contact face 86 of the polymer insert device, at this outer circumferential portion 80, enables fluid-tight contact with the circumferential edge 81, as well as providing sufficient deformation to substantially absorb the high stress generated thereat. Since the tribological coating in this outer circumferential portion 80, particularly at the outer circumferential edge 81, is now exposed to significantly lower stresses, wear, scoring and/or chipping of the tribological coating is also significantly reduced.

Due to the rotating contact between the stator face 22 and the exposed contact face 86 of the insert device, one important material property of the insert device 83 is that the selected polymer performs well in a bearing application under UHP applications. Moreover, while the selected polymer material of the insert device must exhibit high compressive strength, its modulus of elasticity of about 1193 kpsi and a compressive modulus of about 68.4 kpsi, it must be significantly less than that for a ceramic or metallic material of the stator face and/or rotor face. This, of course, allows the polymer insert device 83 to locally absorb the high stresses at these regions. Examples of such suitable polymer materials include natural Polyaryletherketone (PAEK), filled PAEK (e.g., PEEK®) or a polyimide material such as VESPEL®.

Figure 31:
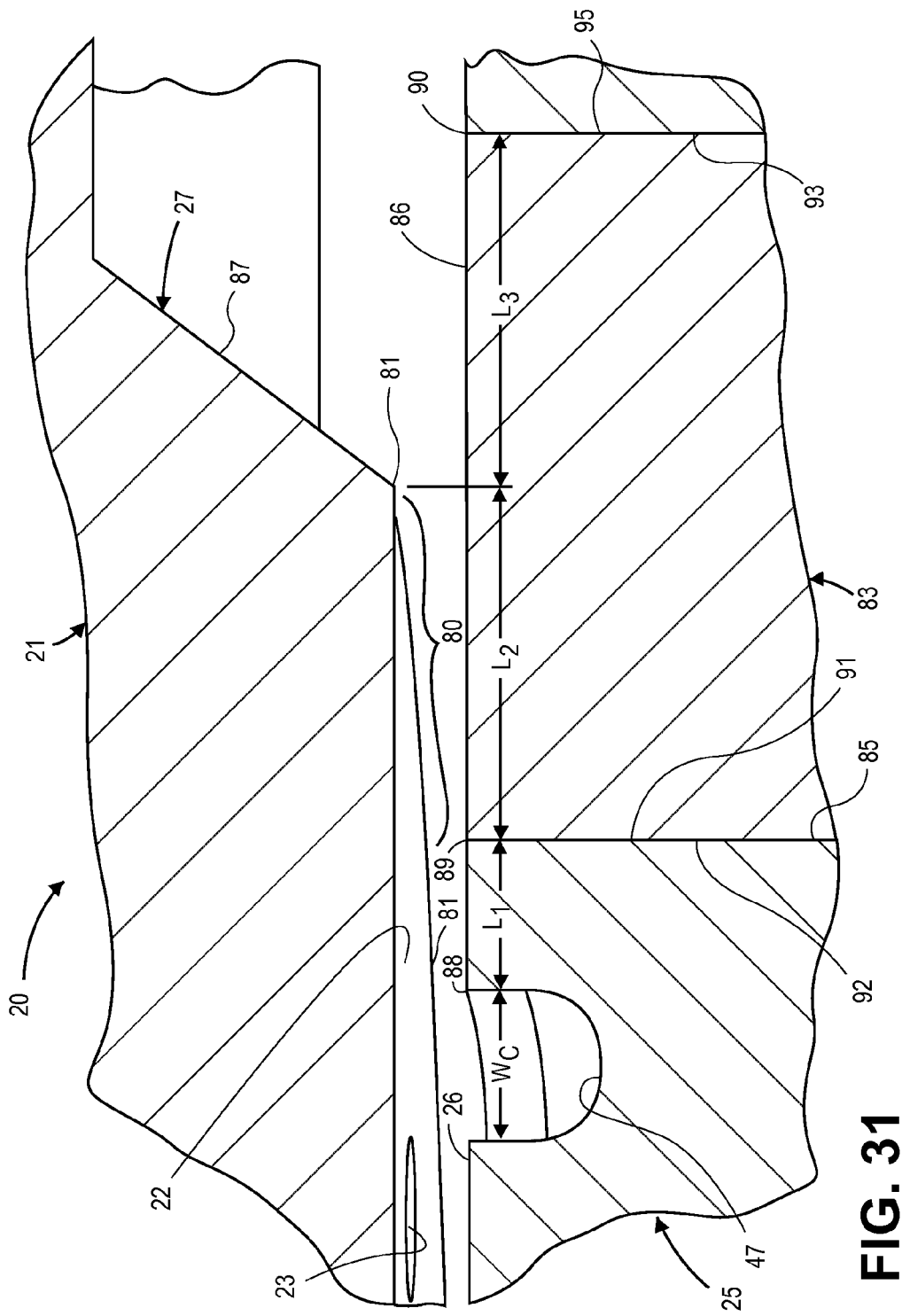
FIG. 31 is a slightly exploded, enlarged, fragmentary, top perspective view of the rotor device and stator device of FIG. 25, showing the outer circumferential portion.

Briefly, while this aspect of the present invention is illustrated and thus described with the outer circumferential edge 81 oriented along either of the stator face 22 or the rotor face 26 (e.g., the stator face 22 in FIGS. 25 and 31), and the other of the rotor face 26 or the stator face 22 supports the opposed insert device 83 thereof, for the ease of description, all reference henceforth relates to placement of the insert device 83 with the rotor face 26. Moreover, it will be appreciated that FIG. 31 illustrates the stator device 21 and the rotor device 25 minutely displaced from one another for the ease of illustration. During operation of the valve assembly 20, the rotor face 26 would be in rotating contact with the stator face 22.

As indicated above, in this particular embodiment, the stator device 21 of the valve assembly 20 incorporates a down-standing stator boss 27. This boss is defined in part by an annular outer circumferential side wall 87 that tapers inwardly, forming a conical-shaped chamfer. This conical side wall 87 intersects the stator face 22, forming the outer circumferential edge 81, in this embodiment.

Positioned in opposed contacting relationship to the outer circumferential portion 80 is the polymer insert device 83. This insert device is preferably ring-shaped (FIGS. 26-29), having a substantially planar exposed contact face 86, and configured to be press-fit disposed in a substantially similarly annular recess or receiving groove 85, defined in the substantially planar rotor face 26. This receiving groove is sized an dimensioned to cooperate with the insert device to fixedly retain the insert to the rotor device 25, during valve operation, and to position the exposed contact face 86 of the polymer insert device 83 substantially flush with that of the substantially planar rotor face 26 when in compressive contact against the stator face 22.

Figure 30:
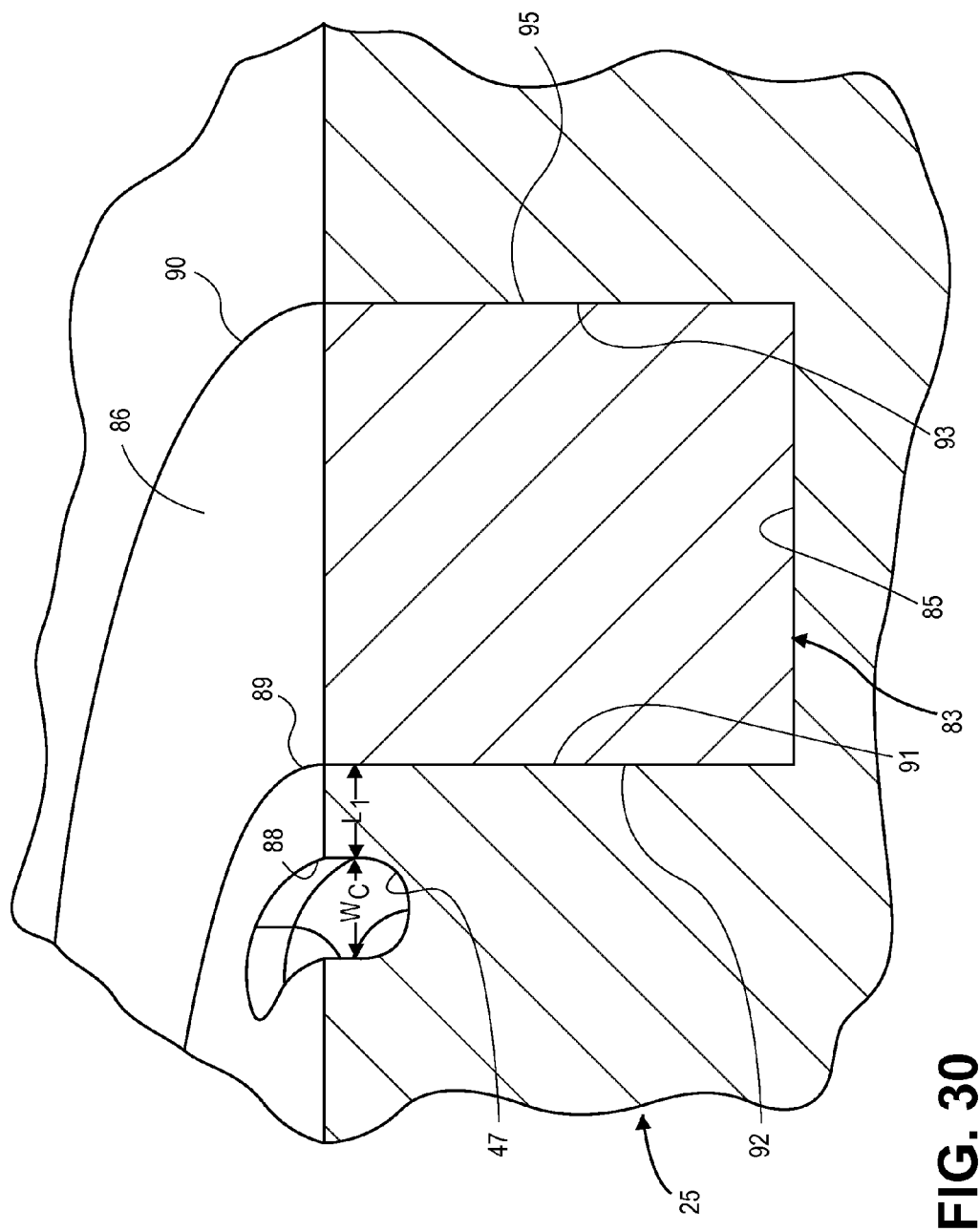
FIG. 30 is an enlarged, fragmentary, top perspective view of the rotor device and insert device of FIG. 29.

To assure contact and alignment of the stator circumferential edge 81 with the contact face 86 of the insert device 83, the groove inner diametric edge 89 of the annular groove 85 is sufficiently spaced radially inwardly from anticipated line of contact between the insert device and the stator outer circumferential edge 81. The radial position of the groove inner diametric edge, however, must sufficiently spaced from an outer edge 88 of the rotor channel 47 so as to enable the formation of a fluid-tight seal is between the stator face 22 and the rotor face under the aforementioned operating conditions (i.e., ultra high pressure, such as 20 kpsi or higher, hard-on-hard applications). In other words, the minimum outer radial depth, $L_1$, between the rotor channel outer edge 88 and the groove inner diametric edge 89 must be sufficient for fluid-tight seal formation. In one specific embodiment, as best illustrated in FIGS. 30 and 31, the minimum outer radial depth, $L_1$, between the rotor channel outer edge 88 and the groove inner diametric edge 89 should be at least about as wide as the width, $W_C$, of the transverse cross section dimension of the rotor channel 47.

On the other hand, it will be appreciated that the minimum interior radial depth, $L_2$, between the groove inner diametric edge 89 and the region of contact with the stator outer circumferential edge 81 to be at least about two times the rotor channel width, $W_C$. Such a minimum interior radial depth, $L_2$, will assure rotational bearing contact of the stator outer circumferential edge 81 with the exposed contact face 86 of the insert device 83.

Similarly, the groove outer diametric edge 90 is also sufficiently spaced radially outward from the outer circumferential portion 80, particularly, the stator circumferential edge 81, to assure contact therebetween. As best shown in FIG. 31, the minimum outer radial depth, $L_3$, between the region of contact with the stator outer circumferential edge 81 and the groove outer diametric edge 90 is preferably at least about as long as the hypotenuse of the chamfer (i.e., the stator boss side wall 87).

The polymer insert device 83, as mentioned above, cooperates with the receiving groove 85 for press-fit receipt therein. Hence, the outer shell of the insert device 83 and the interior walls defining the receiving groove 85 are similarly shaped, formed and dimensioned, with-in predetermined tolerances. The press fit nature of the insert around the inner diametric wall 91 should therefore be sufficient to fixedly retain the insert within the receiving groove 85 during operation of the valve assembly, while at the same time, not be so snug as to jeopardize the structural integrity of the insert device 83. In one particular embodiment, for instance, a diameter of the inner diametric wall 91 of the receiving groove 85 is on the order of about 0.001-0.002" greater than that of the inner wall 92 of the insert device 83 which, when press-fit over the groove inner diametric wall, will be adequate to affix the polymer insert in place during valve operation under UHP applications.

By comparison, however, the polymer insert device 83 and the annular receiving groove 85 are machined such that the groove outer diameter is actually slightly larger than that of the outer diameter of the insert device. This tolerance allows the polymer insert device 83 to expand radially outward while under load. By way of example, the diameter of outer diametric wall 93 of the receiving groove 85 is in the range of about 0.005" to about 0.020" larger than that of the outer wall 95 of the insert device, and more preferably in the range of about 0.010" larger.

Accordingly, in one specific embodiment just described, the insert inner wall 92 and the groove inner diametric wall 91 interface cooperate in a press-fit manner, while the insert outer wall 95 and the groove outer diametric wall 93 interface cooperate in an expansive manner. It will be appreciated, however, that the insert outer wall 95 and the groove outer diametric wall 93 interface cooperate in the above-mentioned press-fit manner, while the insert inner wall 92 and the groove inner diametric wall 91 interface cooperate in above-mentioned expansive manner. In yet another configuration, both the inner and outer interfaces can be configured to cooperate in a press-fit manner.

The minimum depth of the polymer insert device is selected to be in the range of about 0.050" to a maximum depth in the range of about 0.140", and is more preferably about 0.050"". This depth of the polymer insert should be sufficient to extend slightly above the rotor face at least initially, as will be described below.

During fabrication and assembly, the initial height of the insert device 83, however, is selected to be slightly taller than that of the receiving groove 85 so that the exposed contact face 86 is slightly raised above the substantially planar rotor face 26 when the insert device 83 is fully received and inserted therein. Once the insert device 83 has been press-fit around the groove inner diametric wall 91 and into the receiving groove 85 of the rotor device 25, a lapping and polishing process is performed on the rotor seal to procure a very shiny, smooth, substantially planar surface of the rotor face. This procedure ensures that the rotor face 26 and the polymer contact face 86 are substantially planar and substantially flush with one another. After this lapping/polishing procedure, the rotor seal is cleaned and is ready to be assembled into the valve assembly.

Applying the above-mentioned parameters, by way of example and in one particular embodiment, the inner diameter of the insert device is about 0.128" to about 0.129" while the outer diameter thereof is about 0.225". By comparison, the inner diameter of the receiving groove is about 0.130" while the outer diameter thereof is about 0.235".

Figure 32:
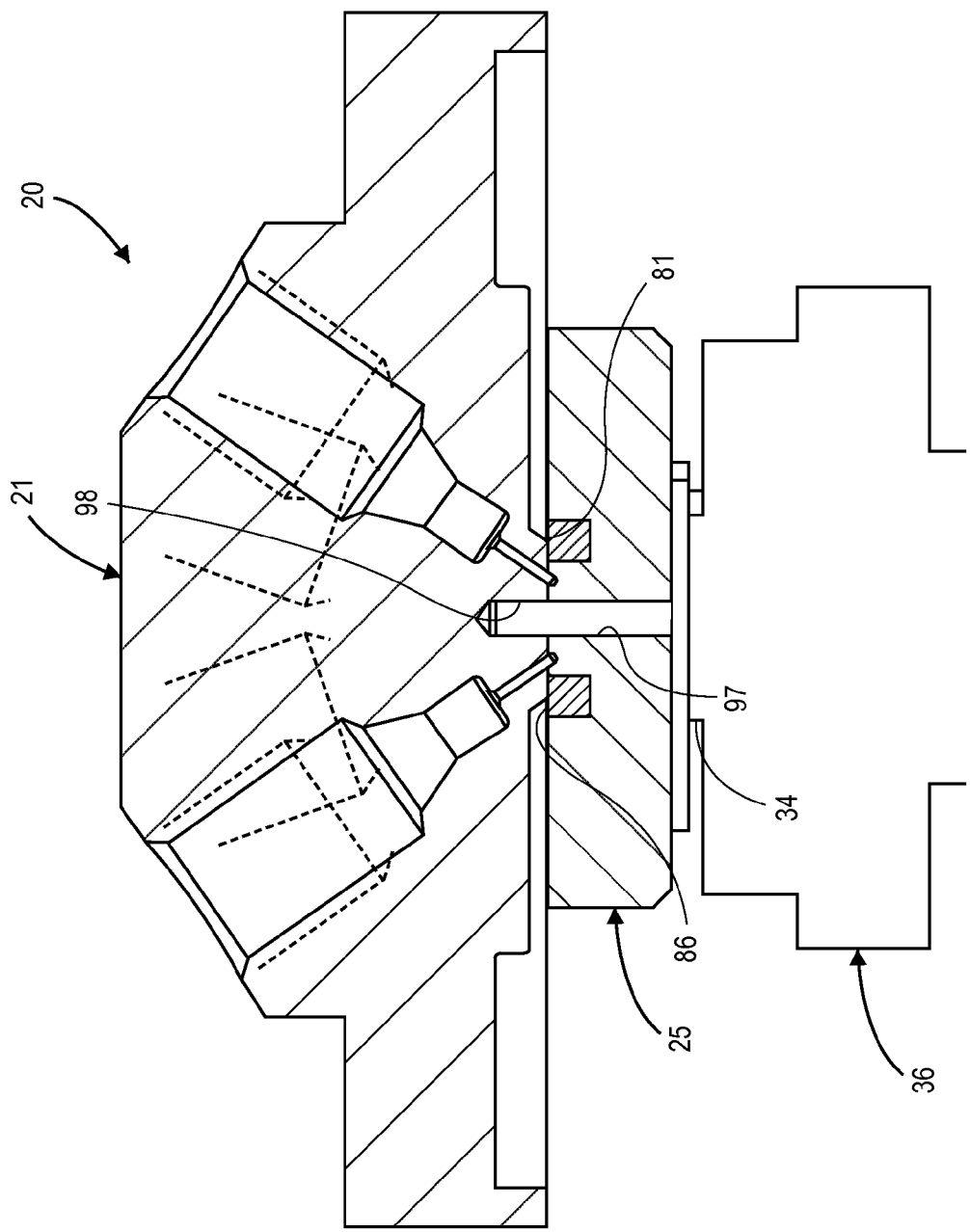
FIG. 32 is an enlarged, fragmentary, side elevation view, in cross-section, of an alternative embodiment of the valve assembly of FIG. 25, incorporating an alignment pin.

As best viewed in FIG. 32, the valve assembly 20 may incorporate an alignment pin 96 that facilitates precise alignment between rotor device 25 and the stator device 21, as well as relative to the head assembly 36. This alignment pin 96 upstands axially from the shaft pad 34, and is formed for sliding receipt through an alignment aperture 97 extending axially through the rotor device 25. Axially aligned with the rotor alignment aperture 97 is a stator alignment slot 98.

Accordingly, upon assembly of the rotor device 25 and the stator device 21 about the alignment pin 96, the rotor face 26 and the stator face 22 are easily aligned, properly aligning the stator outer circumferential edge 81 with the exposed contact face 86.

Furthermore, while the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow. For example, while the present invention is particularly suitable for hard-on-hard UHP applications, it may also be applied in other lower pressure hard-on-hard applications as a means to increase the valve life time.

What is claimed is:

1. A rotary shear valve assembly comprising:
a stator device defining a substantially hard, substantially planar stator face and at least two or more stator channels in fluid communication with said stator face at corresponding stator ports;
a rotor device having a substantially hard, substantially planar rotor face defining one or more rotor channels, each rotor channel having a channel outer edge generally oriented at a channel outer diameter;
one of the stator face and the rotor face terminating at an outer circumferential edge, and the other of the rotor face and the stator face extending radially beyond the outer circumferential edge of the one stator face and the rotor face when said rotor device is rotatably mounted about a rotational axis to the stator device in a face-to-face contacting manner enabling fluid-tight, selective relative rotation between the rotor face and the stator face, at a rotor-stator interface, between two or more rotor positions; and
a polymer insert device defining an exposed contact face having an insert inner diameter greater than said channel outer diameter and less than that of said outer circumferential edge, and an insert outer diameter more than that of said outer circumferential edge, said insert device being formed and dimensioned for press-fit insertion in a receiving groove defined in the other of the rotor face and the stator face such that the outer circumferential edge of the one of the stator face and the rotor face contacts the insert exposed face during said relative rotation between said two or more rotor positions.

2. The valve assembly according to claim 1, further including:
a compliance assembly cooperating with the rotor device in a manner orienting the substantially planar rotor face substantially parallel to and substantially flush against the substantially planar stator face of the stator device.

3. The valve assembly according to claim 1, wherein each rotor channel includes a channel inner diameter such that a radial transverse cross-sectional dimension from the channel inner diameter to the channel outer diameter is generally of a channel width, $W_c$, and wherein a minimum outer radial depth, $L_1$, between the channel outer diameter and a groove inner diameter of the insert receiving groove, is at least as wide as said channel width, $W_c$.

4. The valve assembly according to claim 1, wherein said insert exposed face is donut-shaped and substantially planar.

5. The valve assembly according to claim 4, wherein said receiving groove and said insert device cooperate to position the substantially planar insert exposed face substantially flush with said other of the substantially planar rotor face and the substantially planar stator face.

6. The valve assembly according to claim 4, wherein
a groove inner diameter of the insert receiving groove is in the range of about 0.001 inch to about 0.002 inch greater than an insert inner diameter of the insert device, and
a groove outer diameter of the insert receiving groove is in the range of about 0.005 inch to about 0.020 inch greater than an insert outer diameter of the insert device.

7. The valve assembly according to claim 1, wherein said polymer insert device is composed of a high compressive strength material.

8. The valve assembly according to claim 7, wherein said polymer insert device is composed of one of a natural Polyaryletherketone (PAEK), a filled PAEK and a polyimide material.

9. The valve assembly according to claim 7, wherein said stator face and said rotor face each being composed substantially of one a metallic material and a ceramic material, said valve assembly further including:
a tribological coating disposed atop at least one of said rotor face and said stator face.

10. The valve assembly according to claim 9, wherein said tribological coating is a Diamond Like Carbon coating (DLC).

11. The valve assembly according to claim 10, wherein said tribological coating is disposed atop said stator face, and
said receiving groove is defined in said substantially planar rotor face.

12. A high pressure rotary shear valve assembly comprising:
a stator boss device defining a substantially hard, substantially planar stator face terminating at an outer circumferential edge, and further defining at least two or more stator channels in fluid communication with said stator face at corresponding stator ports;
a rotor device having a substantially hard, substantially planar rotor face defining one or more rotor channels, each rotor channel having a channel outer edge generally oriented at a channel outer diameter, said stator boss device and said rotor device are sufficiently compressed together at a high compression pressure enabling leak-tight, high pressure fluid flow between corresponding stator parts and at least one rotor channel at a face-to-face contacting rotor-stator interface therebetween in the range of at least 15 kpsi to about 25 kpsi, said rotor face extending radially beyond the outer circumferential edge of the stator face when said rotor device is rotatably mounted about a rotational axis to the stator device in a manner enabling fluid-tight, selective relative rotation between the rotor face and the stator face, at said rotor-stator interface, between two or more rotor positions;
a tribological coating disposed atop at least one of said rotor face and said stator face; and
a polymer insert device defining an exposed contact face having an insert inner diameter greater than said channel outer diameter and less than that of said outer circumferential edge, and an insert outer diameter more than that of said outer circumferential edge, said insert device being formed and dimensioned for press-fit insertion in a receiving groove defined in said rotor face such that the outer circumferential edge of said stator face contacts the insert exposed face during said relative rotation between said two or more rotor positions.

13. The valve assembly according to claim 12, further including:
a compliance assembly cooperating with the rotor device in a manner orienting the substantially planar rotor face substantially parallel to and substantially flush against the substantially planar stator face of the stator device.

14. The valve assembly according to claim 12, wherein each rotor channel includes a channel inner diameter such that a radial transverse cross-sectional dimension from the channel inner diameter to the channel outer diameter is generally of a channel width, $W_c$, and
wherein a minimum outer radial depth, $L_1$, between the channel outer diameter and a groove inner diameter of the insert receiving groove, is at least as wide as said channel width, $W_c$.

15. The valve assembly according to claim 12, wherein said insert exposed face is donut-shaped and substantially planar.

16. The valve assembly according to claim 15, wherein said receiving groove and said insert device cooperate to position the substantially planar insert exposed face substantially flush with the substantially planar rotor face.

17. The valve assembly according to claim 15, wherein a groove inner diameter of the insert receiving groove is in the range of about 0.001 inch to about 0.002 inch greater than that of an insert inner diameter of the insert device.

18. The valve assembly according to claim 12, wherein said polymer insert device is composed of a high compressive strength material.

19. The valve assembly according to claim 18, wherein said polymer insert device is composed of one of a natural PAEK, a filled PAEK and a polyimide material.

20. The valve assembly according to claim 12, wherein said stator face and said rotor face each being composed substantially of one a metallic material and a ceramic material.

21. The valve assembly according to claim 20, wherein said tribological coating is a Diamond Like Carbon coating (DLC).

22. The valve assembly according to claim 21, wherein said tribological coating is disposed atop said stator face.

* * * * *

UNITED STATES PATENT AND TRADEMARK OFFICE
CERTIFICATE OF CORRECTION

PATENT NO.         : 8,876,081 B2                          Page 1 of 1
APPLICATION NO.    : 13/296011
DATED              : November 4, 2014
INVENTOR(S)        : Christopher R. Tower It is certified that error appears in the above-identified patent and that said Letters Patent is hereby corrected as shown below:

In the Claims:

Column 15, line 57, Claim 12, change "parts" to --ports--.

Signed and Sealed this
Fifth Day of May, 2015

Michelle K. Lee
*Director of the United States Patent and Trademark Office*